United States Patent
Mathews et al.

(10) Patent No.: US 7,876,693 B2
(45) Date of Patent: Jan. 25, 2011

(54) TESTING AND ERROR RECOVERY ACROSS MULTIPLE SWITCHING FABRICS

(75) Inventors: Gregory S. Mathews, Santa Clara, CA (US); Eric Anderson, Palo Alto, CA (US); Philip Ferolito, Sunnyvale, CA (US); Mike Morrison, Sunnyvale, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1377 days.

(21) Appl. No.: 10/453,976

(22) Filed: Jun. 4, 2003

(65) Prior Publication Data

US 2004/0037277 A1 Feb. 26, 2004

Related U.S. Application Data

(60) Provisional application No. 60/385,863, filed on Jun. 4, 2002.

(51) Int. Cl.
*H04J 3/14* (2006.01)
(52) U.S. Cl. ..................................................... 370/244
(58) Field of Classification Search ................. 370/242, 370/244
See application file for complete search history.

(56) References Cited

U.S. PATENT DOCUMENTS

| 6,272,107 | B1 * | 8/2001 | Rochberger et al. ......... 370/216 |
| 7,020,393 | B2 * | 3/2006 | Schaller et al. ............... 398/16 |
| 7,058,010 | B2 * | 6/2006 | Chidambaran et al. ...... 370/218 |
| 2002/0089977 | A1 | 7/2002 | Chang |
| 2003/0117961 | A1 * | 6/2003 | Chuah et al. ................. 370/242 |

* cited by examiner

*Primary Examiner*—Jianye Wu
(74) *Attorney, Agent, or Firm*—Wilson & Ham

(57) ABSTRACT

A packet-based traffic switching system with error detection and correction without taking the system offline. The system tests offline paths without interfering with other online paths. Also, the system tests online paths even while no data cell traffic is sent over the paths. The system responds to the addition or removal of paths or path components without interrupting cell traffic. The system detects and selectively flushes defective paths without impacting paths that are working properly. The system initializes new switching fabrics automatically without using software to set values. Thus, the system tests online paths and corrects errors without going offline.

7 Claims, 19 Drawing Sheets

500A →

| Time | Fabric 0 | Fabric 1 | Fabric 2 | Fabric 3 |
|---|---|---|---|---|
| 0 | Packet A.0 | Packet A.1 | Packet A.2 | Packet A.3 |
| 1 | Packet A.4 | Packet A.5 | Packet A.6 | IDLE |
| 2 | AFM | AFM | AFM | IDLE |
| 3 | Packet A.7 | Packet A.8 | Packet A.9 | IDLE |
| 4 | Packet A.10 | Packet A.11 | Packet A.12 | AFM |
| 5 | AFM | AFM | AFM | Packet A.13 |
| 6 | Packet A.14 | Packet A.15 | Packet A.16 | Packet A.17 |

| Time | Fabric 0 | Fabric 1 | Fabric 2 | Fabric 3 |
|---|---|---|---|---|
| 0 | Packet A.0 | Packet A.1 | Packet A.2 | Packet A.3 |
| 1 | Packet A.4 | Packet A.5 | Packet A.6 | Test |
| 2 | Test | Test | Test | Packet A.7 |
| 3 | Packet A.8 | Packet A.9 | Packet B.0 | Packet B.1 |

| Time | Fabric 0 | Fabric 1 | Fabric 2 | Fabric 3 |
|---|---|---|---|---|
| 0 | Packet A.0 | Packet A.1 | Packet A.2 | Packet A.3 |
| 1 | Packet A.4 | Packet A.5 | Packet A.6 | IDLE |
| 2 | Test | Test | Test | Test |
| 3 | Packet B.0 | Packet B.1 | Packet B.2 | Packet B.3 |

| Time | Fabric 0 | Fabric 1 | Fabric 2 | Fabric 3 |
|---|---|---|---|---|
| 0 | Packet A.0 | Packet A.1 | Packet A.2 | Packet A.3 |
| 1 | Packet A.4 | Test | Packet A.6 | Test |
| 2 | Test | IDLE | Test | IDLE |

FIGURE 5D

TESTING AND ERROR RECOVERY ACROSS MULTIPLE SWITCHING FABRICS

CROSS REFERENCE TO RELATED APPLICATION

This application is entitled to the benefit of provisional Patent Application Ser. No. 60/385,863, filed Jun. 4, 2002. This application incorporates by reference co-pending patent application serial number (TBD), filed herewith, entitled "OPTIMAL LOAD BALANCING ACROSS MULTIPLE SWITCHING FABRICS".

FIELD OF THE INVENTION

The present invention relates generally to packet-based traffic forwarding, and more particularly to testing and error recovery across multiple switching fabrics in a packet-switched network node.

BACKGROUND OF THE INVENTION

Packet-switched networks are responsible for forwarding packet-based traffic. In some hardware devices, such as switches and routers, a system breaks packets into fixed-length cells and forwards the cells from an ingress, across a switching fabric, to an egress, where the system typically reassembles the cells into packets.

Systems with multiple switching fabrics may forward cells in parallel or serially. These configurations are discussed in co-pending patent application serial number (TBD), entitled "OPTIMAL LOAD BALANCING ACROSS MULTIPLE SWITCHING FABRICS", which is incorporated herein by reference. As the number of data paths grows, error detection, error correction, and system maintenance become more complex. More data paths means more chances for data paths to fail. Moreover, systems with many data paths may require more hardware components, such as multiple switching fabrics. Swapping components in and out of a system can cause more frequent failures.

In view of the desire to perform error recovery and other maintenance in a system with multiple switching fabrics, what is needed is a means for performing online diagnostics. In addition, it would be advantageous to perform offline diagnostics for some data paths without interfering with data transmission on other paths. This would enable the system to remain online while diagnosing some paths offline. It would further be advantageous to detect errors across a given path even when no data is transmitted along the given path. This would enable the system to differentiate between "no traffic" and a "broken path". It would further be advantageous to facilitate the addition and removal of switching fabrics while seamlessly transmitting traffic. This would enable changing, maintaining, or upgrading system hardware without taking the system offline. It would further be advantageous to detect nonfunctional queues in the switching fabric and respond by selectively flushing the nonfunctional queues, thereby limiting the impact on other system resources. It would be further advantageous to provide automatic initialization of newly added switching fabrics. It would be further advantageous to perform online detection and correction of errors.

SUMMARY OF THE INVENTION

A technique for performing error recovery in a system with multiple switching fabrics includes testing ingress-to-egress paths across the switching fabrics while the system is online. In an embodiment, this technique includes offline testing for some paths without interfering with other online paths. In another embodiment, the technique includes the testing of online paths even while no data cell traffic is sent over the paths. In another embodiment, the technique includes responding to the addition or removal of paths or path components without interrupting cell traffic forwarding. In another embodiment, the technique includes detecting and selectively flushing defective paths without impacting paths that are working properly. In another embodiment, the technique includes initializing new switching fabrics automatically without using software to set values. In another embodiment, the technique includes testing online paths and correcting errors without going offline.

Embodiments include methods for implementing the techniques described above. Embodiments further include systems that implement the techniques described above.

Other aspects and advantages will become apparent from the following detailed description, taken in conjunction with the accompanying drawings, illustrating by way of example the principles of the invention.

BRIEF DESCRIPTION OF THE DRAWINGS

FIGS. 5A-5D depict exemplary striped traffic consistent with traffic striped across the subsystem of FIG. 2 in an embodiment of the invention.

DETAILED DESCRIPTION OF THE INVENTION

Figure 1:
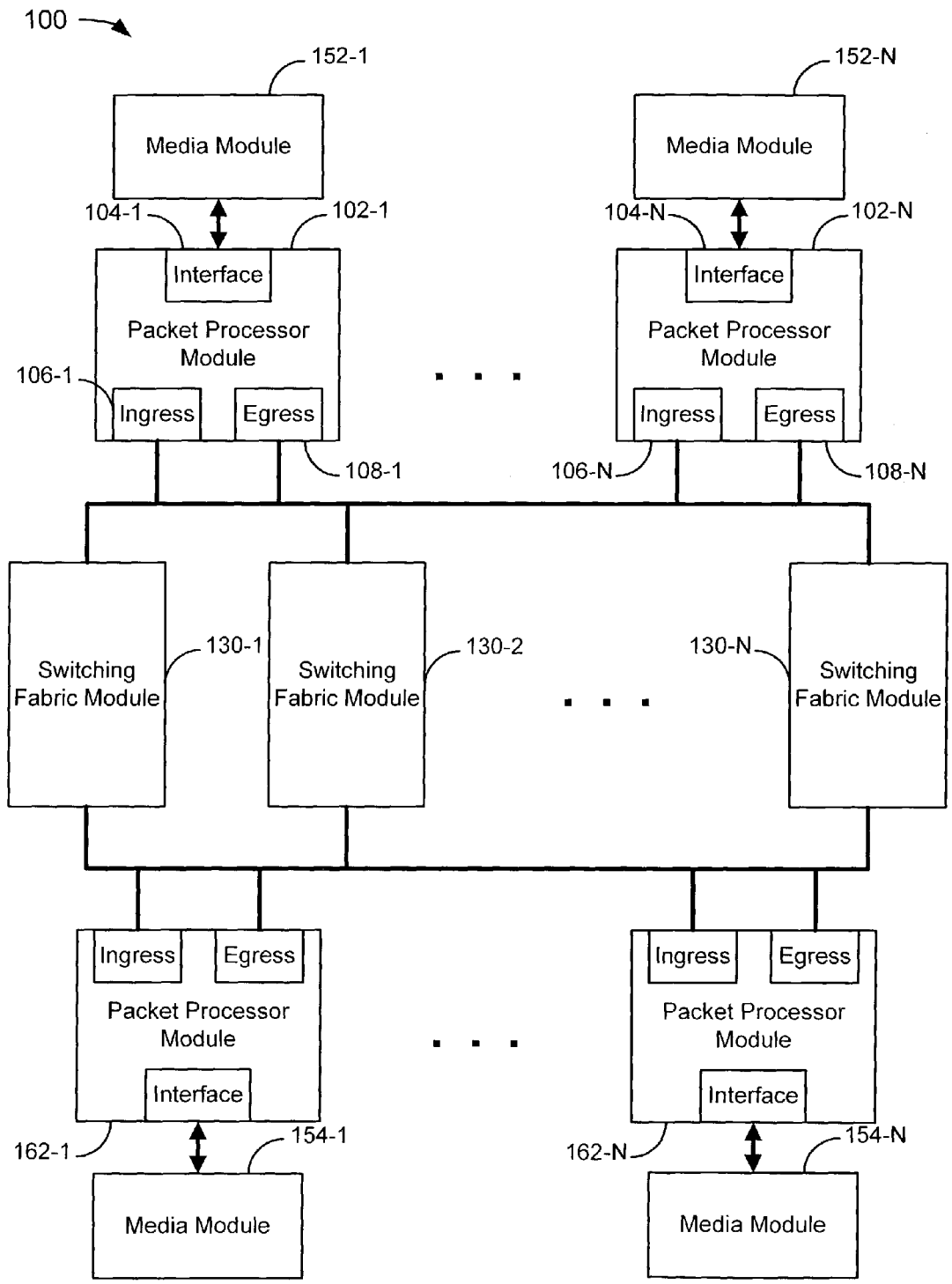
FIG. 1 is a block diagram of a traffic forwarding system.

As shown in the drawings for the purposes of illustration, an embodiment of the invention tests for and recovers from errors in a traffic forwarding system, having multiple switching fabric modules, configured for use in a network with packet-based traffic. An exemplary traffic forwarding system is described in co-pending patent application serial number (TBD), entitled "OPTIMAL LOAD BALANCING ACROSS MULTIPLE SWITCHING FABRICS" and bearing, which has been incorporated by reference.

FIG. 1 is a block diagram of a packet-based traffic forwarding system 100. The system 100 includes media modules 152-1 to 152-N and 154-1 to 154-N, packet processor modules 102-1 to 102-N (referred to collectively as the packet processor modules 102) and 162-1 to 162-N (referred to collectively as the packet processor modules 162), and switching fabric modules 130-1 to 130-N (referred to collectively as the switching fabric modules 130). The media modules 152-1, 152-N, 154-1, and 154-N are respectively coupled to the packet processor modules 102-1, 102-N, 162-1, and 162-N. It should be noted that each packet processor module may or may not be coupled to one or more media modules (not shown). The packet processor modules 102 and 162 are coupled to the switching fabric modules 130. The switching fabric modules 130 include circuitry to replicate cells by writing to multiple buffers. This functionality may be used with multicast cells that target a plurality of egress destinations. The packet processor module 102-1 includes an interface module 104-1 configured to forward packets to and from the media module 152-1, an ingress module 106-1 configured to forward cells to the switching fabric modules 130, and an egress module 108-1 configured to receive cells from the switching fabric modules 130. The packet processor modules 102 and 162 have comparable components and couplings. In an embodiment, the interface modules 104 are configured to receive packets. If a packet is too large to fit in a single cell, it is broken into portions and a separate cell encapsulates each portion. For example, in an embodiment wherein each cell includes 62 bytes of a packet as payload, a packet of 130 bytes is broken into 3 cells. The first and second cells each include 62 bytes of the packet and the third cell includes 6 bytes of the packet. When a cell is not completely filled, as in the case of the third cell, the remaining payload bytes are typically unused. In an embodiment, the system 100 is an Ethernet-based switch or an Ethernet-based router that forwards traffic within the system 100 using Layer 2, Layer 3, and/or Layer 4 header information. The system 100 may include line cards that support network protocols such as Ethernet, ATM, and Frame Relay. Although an Ethernet-based switch/router is described, the disclosed cell reassembly techniques can be applied to any system that has multiple switching fabrics. In an embodiment, the system 100 includes one or more processors (not shown), a detailed explanation of which is not necessary to understand the invention. In an embodiment, each of the packet processor modules 102 and 162 include line card central processing units (CPUs) (not shown), a detailed explanation of which is not necessary to understand the invention.

Figure 2:
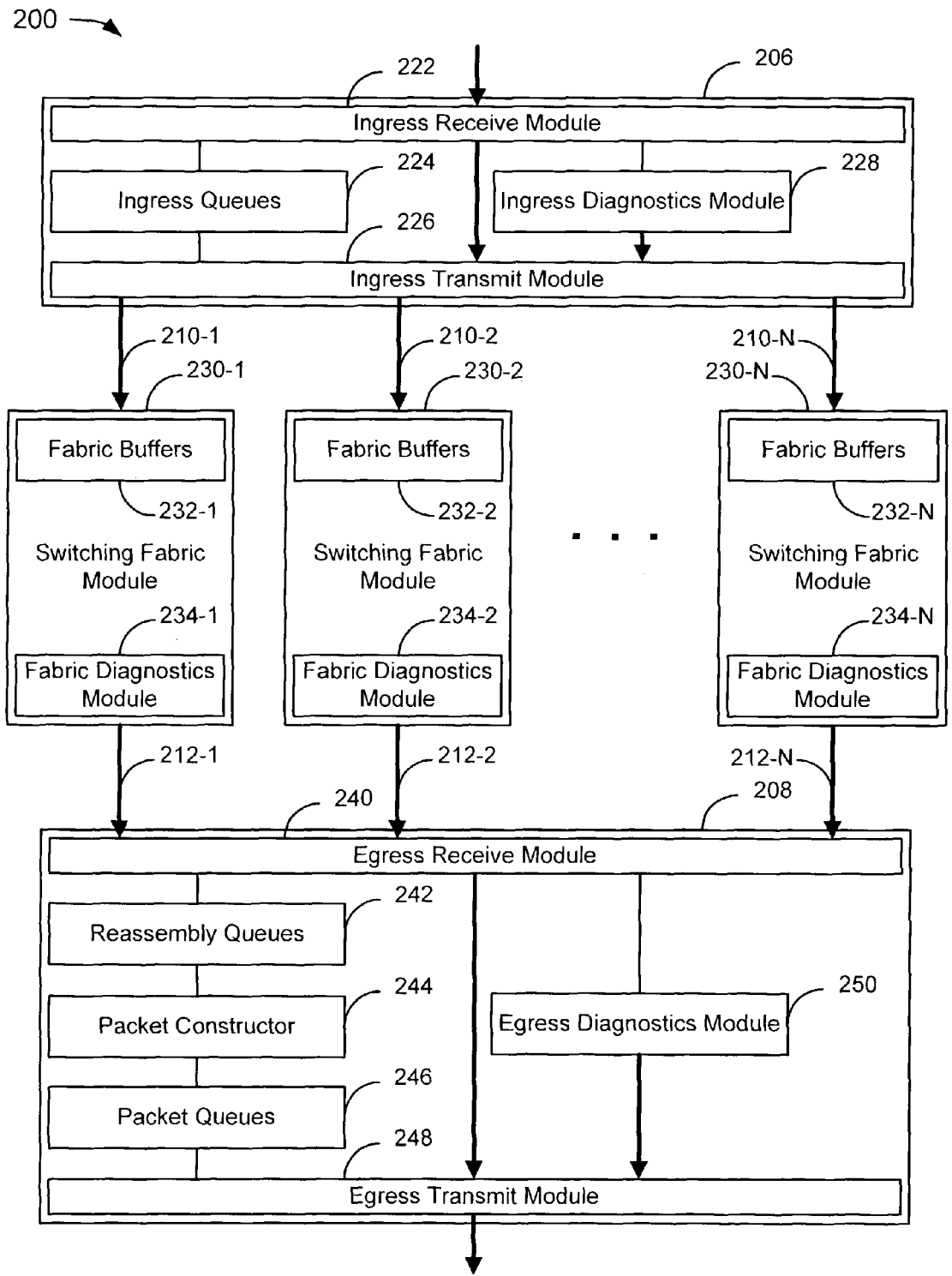
FIG. 2 is a block diagram of a traffic forwarding subsystem for use with the system of FIG. 1.

FIG. 2 is a block diagram of a traffic forwarding subsystem 200 for use with the system 100 (FIG. 1). FIG. 2 is intended to illustrate the generation of test cells by diagnostic modules, and how data cells and the test cells traverse the subsystem 200. The use of test cells is discussed later with reference to FIGS. 3, 4, and 5. The subsystem 200 includes an ingress module 206, switching fabric modules 230-1 to 230-N (referred to collectively as the switching fabric modules 230), and an egress module 208. High-speed interfaces (HSIs) 210-1 to 210-N (referred to collectively as HSIs 210) respectively couple the switching fabric modules 230 to the ingress 206. HSIs 212-1 to 212-N (referred to collectively as HSIs 212) respectively couple the switching fabric modules 230 to the egress 208.

The ingress module 206 includes an ingress receive module 222, ingress queues 224, an ingress transmit module 226, and an ingress diagnostics module 228. The switching fabric modules 230 include switching fabric buffers 232-1 to 232-N (collectively referred to as switching fabric buffers 232) and fabric diagnostics modules 234-1 to 234-N (collectively referred to as fabric diagnostics modules 234). The egress module 208 includes an egress receive module 240, reassembly queues 242, a packet constructor 244, packet queues 246, an egress transmit module 248, and an egress diagnostics module 250. The ingress diagnostics module 228, fabric diagnostics modules 234, and egress diagnostics module 250 may collectively be referred to as the system diagnostics module.

The ingress module 206 is configured to receive cell traffic at the ingress receive module 222. The cell traffic may include data cells that include portions of packets and test cells received from another egress. In an embodiment, an egress located on the same packet processor module as the ingress (see, e.g., FIG. 1) communicates with the ingress across a bus (not shown) in the packet processor module. In an alternative, the egress module 208 communicates with the ingress module 206 by having an ingress on the same packet processor module as the egress module 208 forward a message to an egress on the same packet processor module as the ingress module 206. The egress on the same packet processor module as the ingress module 206 then forwards the message to the ingress module 206.

After receiving cell traffic at the ingress receive module 222, the ingress module 206 may enqueue cells in the ingress queues 224. As a general rule, cells that are to be forwarded through the ingress are enqueued in the ingress queues 224. Accordingly, data cells are enqueued in this manner. On the other hand, some test cells may be used by the ingress diagnostics module 228 and discarded without enqueuing the test cells in the ingress queues 224. It should be noted that, in an embodiment, the ingress queues 224 actually enqueue tokenized cells. The ingress 206 stores the cells themselves in packet memory (not shown) using memory write operations while indicators of the cells (e.g., tokens) are stored in the queues. In an embodiment, the tokenized cells are pointers to the cells in packet memory. The ingress 206 performs arbitration and other operations on the tokenized cells until it is time for the transmit module 226 to transmit the cells, at which time the transmit module 226 reads the cells from packet memory with a read operation and transmits the cells to the switching fabric modules 230. As the receive module 222 receives cells, the receive module 222 assigns the pointers to the cells. Unused pointers may be maintained in a pointer memory (not shown). In any case, in an embodiment, the ingress queues 224 include at least one queue for each traffic class (e.g., priority) of a cell. In an alternative, unicast and multicast queues are maintained separately and unicast queues further include a queue for each destination (e.g., target egress) of the cell. The at least one queue associated with a particular traffic class has associated queues in the switching fabric modules 230 and the egress module 208 and other egress modules (not shown). Accordingly, the ingress module 206 sends each cell of each traffic class to the egress module 208 (and other egress modules) on an ingress-to-egress channel. Since there are typically a plurality of switching fabric modules, cells of a traffic class may take different paths. For example, a first cell may traverse the ingress-to-egress channel across a first switching fabric module and a second cell may traverse across a second switching fabric module.

After the ingress receive module 222 enqueues cells in the ingress queues 224, the ingress queues 224 wait for the ingress transmit module 226 to determine which cells to transmit. The ingress transmit module 226 also considers test cells in the determination. The ingress diagnostics module 228 generates test cells. The system treats test cells much like any other cell, but the test cells are often assigned a high (e.g., a control) priority. The transmit module 226 stripes the data and test cells across HSIs 210 according to, for example, an arbitration algorithm. The transmit module 226 then recycles the pointers used to tokenize the cells. In an embodiment, the ingress transmit module 226 consults an active fabric mask (AFM), which is set by the ingress diagnostics module 228, to determine which switching fabrics are enabled to transmit data cells and non-diagnostic test cells (i.e., included in the striping sequence). In another embodiment, the ingress transmit module 226 consults a test fabric mask (TFM), which is set by the ingress diagnostics module 228, to determine which switching fabrics are enabled to transmit diagnostic test cells. For example, for 4 switching fabrics 0 to 3, an AFM of '1101' indicates the switching fabrics 0, 1, and 3 are enabled for data transmission. A TFM of '0010' indicates the switching fabrics 2 is enabled for testing. Accordingly, the ingress transmit module 226 stripes data cells across the switching fabrics 0, 1, and 3, skipping switching fabric 2, and the ingress transmit module 226 transmits diagnostic test cells across switching fabric 2. It should be noted that the switching fabrics could be enabled for both data and diagnostic testing simultaneously. In another embodiment, switching fabrics enabled for data transmission cannot be enabled for diagnostic test cells (i.e., AFM overrides TFM). The AFM and TFM thereby facilitate efficient arbitration between cells that are contending for transmission across the switching fabrics.

The switching fabric modules 230 receive cells from the HSIs 210. Cells are stored in the switching fabric buffers 232 for forwarding onto HSIs 212. The fabric diagnostics module 234 responds to some test cells as described later.

The egress module 208 is configured to receive cells at the egress receive module 240. Much as described previously with reference to the ingress module 206, in an embodiment, cells are stored in a packet memory (not shown) and pointers are stored in a pointer memory (not shown). The egress receive module 240 assigns pointers to the cells and writes the cells to packet memory. Arbitration and other operations use the tokenized cell (e.g., the pointer). The egress receive module 240 enqueues data cells (or, more specifically, tokenized data cells) in the reassembly queues 242. Since the ingress 206 stripes the cells across the switching fabrics 230, the packet constructor 244 must reassemble packets from the cells according to a striping reassembly sequence that corresponds to the striping sequence. The reassembly queues 242 may logically be divided into reassembly queue sets (RQSs) such that each RQS has one reassembly queue per switching fabric. Each RQS is associated with a traffic class and, therefore, with an ingress-to-egress channel. The packet constructor 244 enqueues the reassembled packets in the packet queues 246. The egress transmit module 248 transmits the packets according to, for example, an arbitration algorithm. In an embodiment, the transmission of a packet entails reading the packet from packet memory and recycling pointers assigned to the cell(s) of the packet. The egress diagnostics module 250 responds to some test cells as described later. The egress diagnostics module 250 also generates test cells of its own for transmission by the egress transmit module 248. In an embodiment, the egress transmit module 248 transmits the test cells to an ingress on the same packet processor module as the egress module 208, but transmits the data cells to a media module (see, e.g., FIG. 1).

Figure 3A:
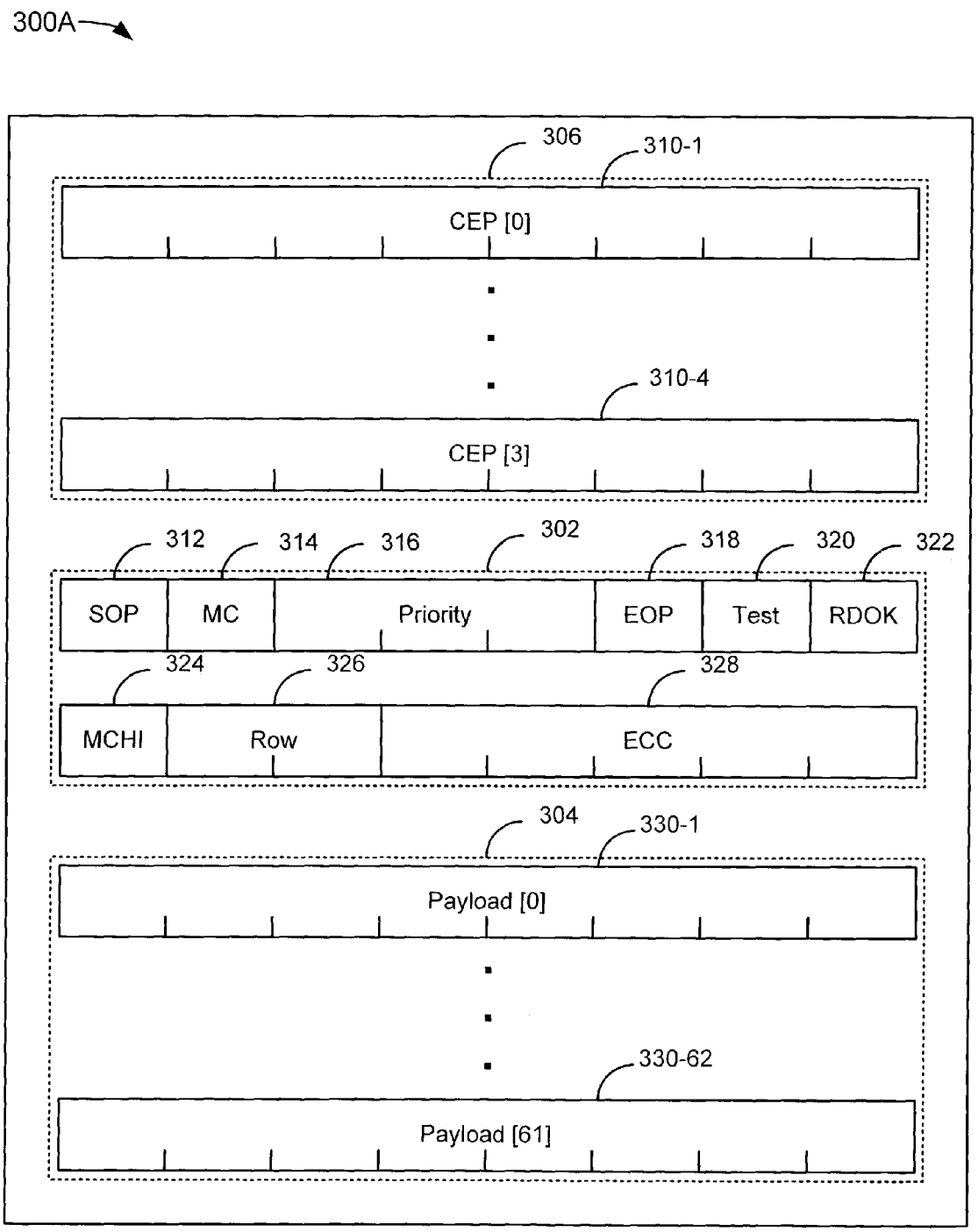
FIGS. 3A-3G are block diagrams of an exemplary data cell and exemplary test cells for use with the system of FIG. 1.

FIG. 3A is a block diagram of an exemplary data cell 300A for use with the system 100 (FIG. 1). The data cell 300A includes a header 302, payload 304, and an additional header 306. The header 302 includes a start-of-packet (SOP) flag 312, a multicast (MC) flag 314, a priority field 316, an end-of-packet (EOP) flag 318, a test flag 320, a read OK (RDOK) flag 322, a channel exit port (CEP) high (HI) flag (MCHI) 324, a row identifier (ID)/continuation field 326, and an error check and correct (ECC) field 328. The payload 304 includes 62 bytes of payload 330-1 to 330-62. The header 302 and payload 304 make up a 64-byte cell. The additional header 306 increases the size of the cell by, in the exemplary cell 300A, 4 bytes. The additional header 306 includes 4 CEP bytes 310-1 to 310-4 (collectively referred to as the CEP field 310). The information in the additional header 306 varies depending upon several factors, an understanding of which is not necessary to understand the invention.

The SOP flag 312 is set if a packet is broken into portions and the payload 330 of the cell 300A includes the first portion of the packet. The MC flag 314 is set if the packet is multicast and not set if the packet is unicast. The priority field 316 contains the priority of the packet. In an embodiment, the priority field 316 is 3 bits long, which allows the priority field 316 to represent up to 8 priorities. In another embodiment, packets having different priorities are forwarded to and from and reassembled in different queues. The EOP flag 318 is set if the payload 330 of the cell 300A includes the last portion of the packet. If a packet is small enough to fit in a single data cell, both the SOP flag 312 and the EOP flag 318 are set. In other words, a one-cell packet has both the SOP flag 312 and the EOP flag 318 set. The test flag 320 indicates whether a cell is a data cell or a test cell. Since the cell 300A is a data cell, the test flag 320 is not set (e.g., it is set to zero). However, for test cells, the test flag 320 is set (e.g., it is set to one). The RDOK flag 322 is set by the ingress module 106-1, if the egress module 108-1 on the same packet processor module can accept cells from (e.g., is not full) the switching fabric modules 130. The RDOK flag 322 is set during normal operation. The HI flag 324 is used in conjunction with the CEP field 310 to identify a set of egress ports for the cell 300A. In an embodiment, the CEP field 310 is a 4-byte bit field where each bit indicates an egress port. Since there are 32 bits in the 4-byte bit field, the CEP field 310 could be used to indicate up to 32 unique egress ports. However, in an embodiment with 64 unique egress ports, the HI bit may be used to distinguish between the 32 "low" egress ports and the 32 "high" egress ports. Thus, in this embodiment, the CEP field 310 and the HI bit, used together, identify up to 64 unique egress ports. In an embodiment, the CEP field 310 is set when sending the cell 300A from an ingress and replaced with other control information after the cell 300A is received at an egress such as the ingress from which the cell originated. In an embodiment, the row ID/continuation field 326 is a 2-bit rotating row identifier that is compared a 2-bit running counter (there is one per unicast egress reassembly queue) at the egress if the cell 300A is a unicast cell (e.g., the MC flag 314 is not set). The function of the row ID/continuation field 326 is discussed later with reference to FIG. 4G for unicast cells. The ECC field 328 is used for error checking and correction of portions of the cell. A detailed explanation of the ECC field 328 is not necessary for an understanding of the invention.

FIGS. 3B-3G are block diagrams of exemplary test cells for use with the system 100 (FIG. 1) in an embodiment of the invention. An additional header (not shown) similar to the additional header 306 (FIG. 3A) may be attached to a test cell, but a detailed explanation of the additional header is not necessary for an understanding of the invention. Fields not described with reference to each of the FIGS. 3B to 3G include ECC fields, reserved fields, and static fields (e.g., fields set to all '0' or some other pattern). A detailed explanation of these fields has been omitted and is not necessary for an understanding of the invention.

Figure 3B:
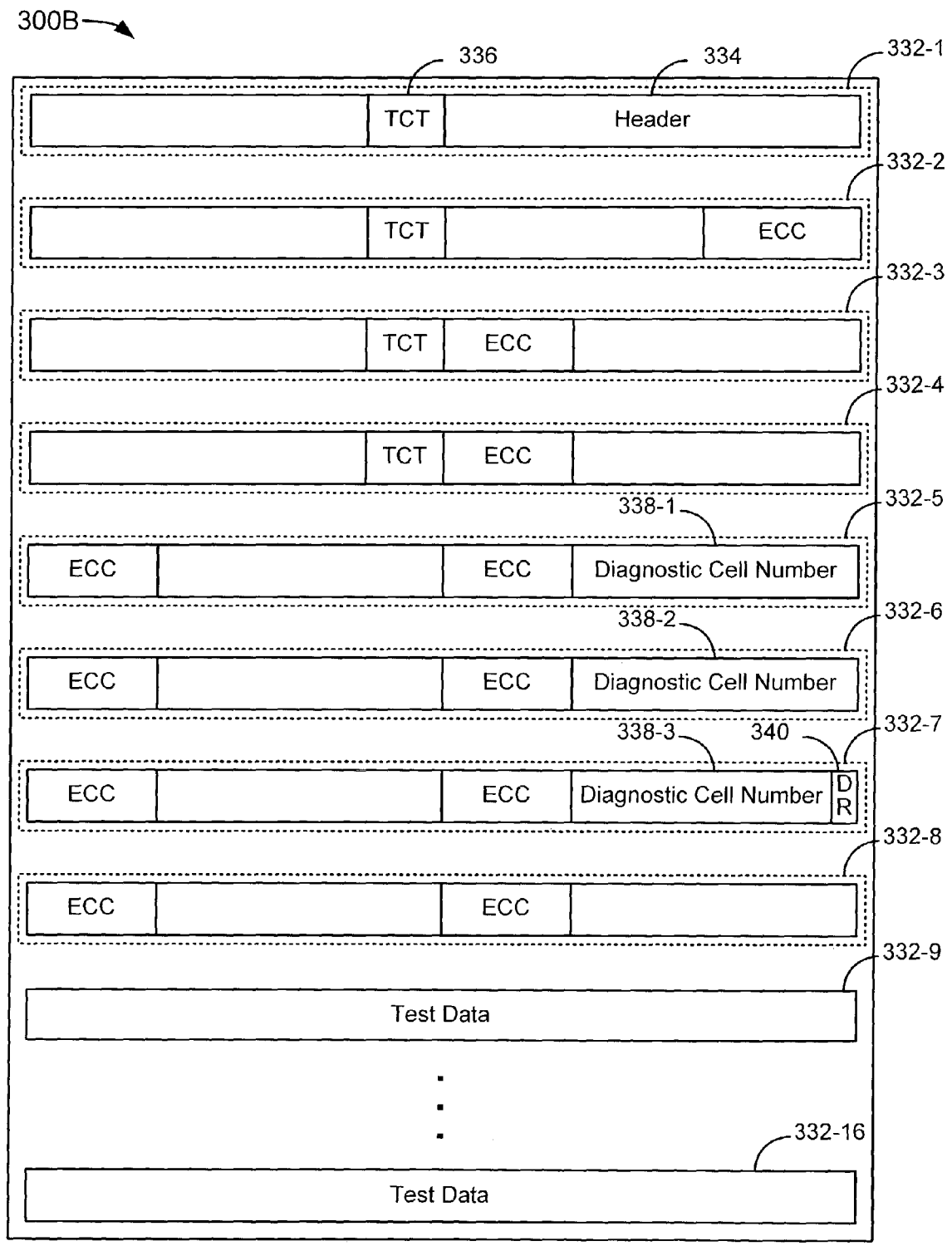

FIG. 3B is a block diagram of an exemplary diagnostic cell 300B that is used to facilitate diagnosis of a path of an ingress-to-egress channel in the system 100 (FIG. 1) in an embodiment of the invention. The diagnostic cell 300B includes 16 4-byte words 332-1 to 332-16. Accordingly, the diagnostic cell 300B is the same size as the header 302 and payload 304 of the data cell 300A (FIG. 3A). The diagnostic cell 300B includes a header 334 that is similar to the header 302 (FIG. 3A), one or more 3-bit test cell type (TCT) fields 336 that identify the test cell type (e.g., for the diagnostic cell 300B the field is set to '000'), a series of diagnostic cell number fields 338-1 to 338-3 (collectively referred to as the diagnostic cell number field 338), and a diagnostic cell number reset (DR) field 340. The diagnostic cell number field 338 is used to keep count of the number of diagnostic cells sent over a period of time. The DR field is used to reset the diagnostic cell number field 338 to a reset value (e.g., zero). In an embodiment, the 4-byte words 332-9 to 332-16 are test data that is set by software. These fields are used to verify that data is properly received when the diagnostic cell 300B is forwarded from an ingress to an egress, as described later with reference to FIG. 4A.

Figure 3C:
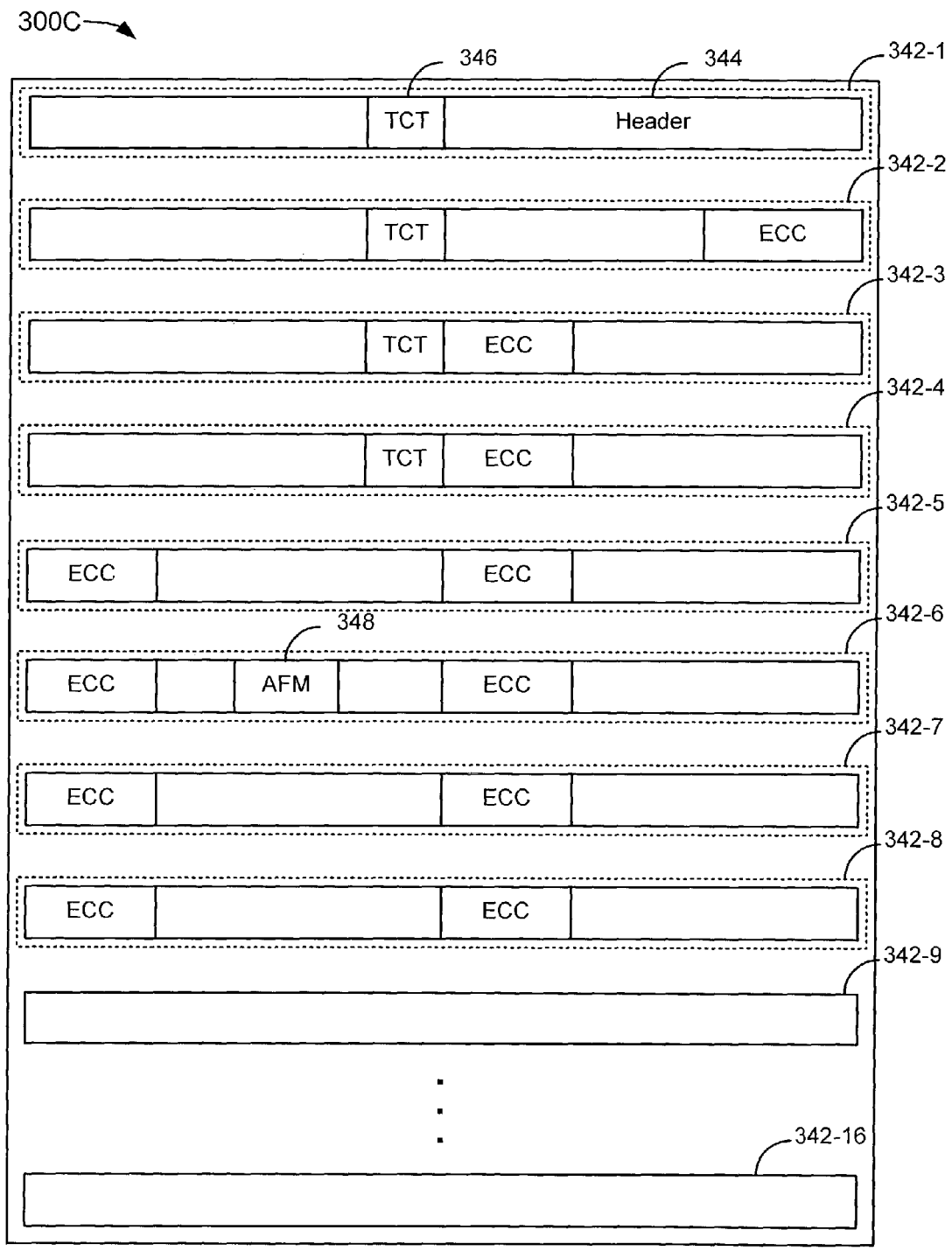

FIG. 3C is a block diagram of an exemplary active fabric mask (AFM) cell 300C that is used to inform an egress module of an AFM change at an ingress module in the system 100 (FIG. 1) in an embodiment of the invention. The AFM cell 300C includes 16 4-byte words 342-1 to 342-16. Accordingly, the AFM cell 300C is the same size as the header 302 and payload 304 of the data cell 300A (FIG. 3A). The AFM cell 300C includes a header 344 that is similar to the header 302 (FIG. 3A), one or more 3-bit TCT fields 346 that identify the test cell type (e.g., for the AFM cell 300C the field is set to '001'), and a 4-bit AFM field 348 that identifies which switching fabric modules 130 (FIG. 1) are active and enabled for data transfer. In this example, the four bits of the AFM field 348 are respectively associated with four switching fabric modules 130. When a bit of the AFM field 348 is set, that indicates the corresponding switching fabric module is considered to be active (i.e., the switching fabric module is ready to forward data cells) and enabled to transfer data cells at the ingress. A use for the AFM cell 300C is discussed later with reference to FIGS. 4A, 4C, and 4D.

Figure 3D:
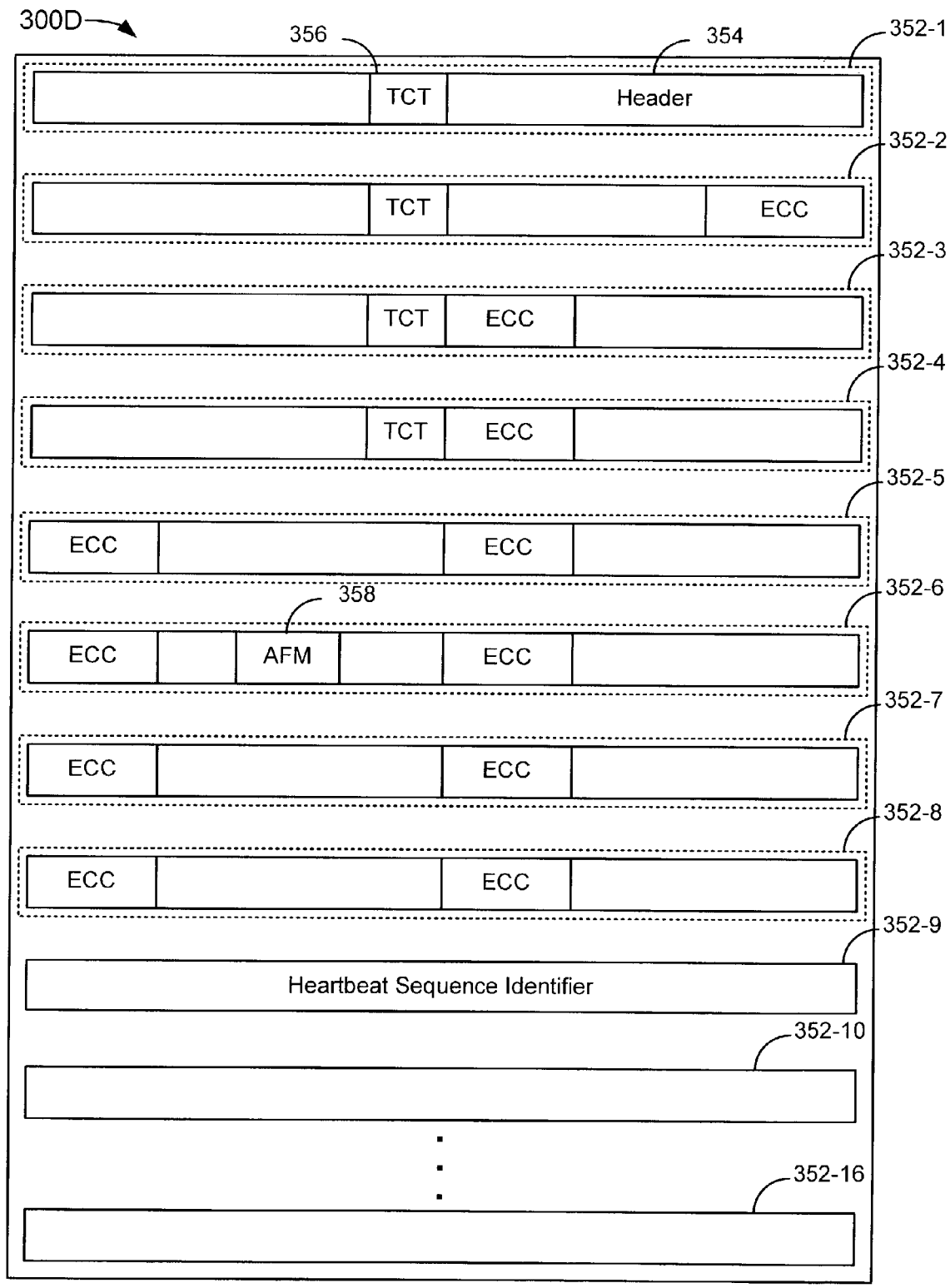

FIG. 3D is a block diagram of an exemplary heartbeat cell 300D that is used to periodically diagnose paths of an ingress-to-egress channel in the system 100 (FIG. 1) in an embodiment of the invention. The heartbeat cell 300D includes 16 4-byte words 352-1 to 352-16. Accordingly, the heartbeat cell 300D is the same size as the header 302 and payload 304 of the data cell 300A (FIG. 3A). The heartbeat cell 300D includes a header 354 that is similar to the header 302 (FIG. 3A), one or more 3-bit TCT fields 356 that identify the test cell type (e.g., for the heartbeat cell 300D the field is set to '010'), a 4-bit AFM field 358 that identifies which switching fabric modules 130 (FIG. 1) are currently active and enabled for data transfer, and a heartbeat sequence identifier field 352-9 that is used to keep track of heartbeat cells. The AFM field 358 is used for the purpose of checking, not setting, active switching fabric configurations; the AFM cell 300C (FIG. 3C) is used to facilitate changing the active switching fabric configurations. A use for the heartbeat cell 300D is discussed later with reference to FIG. 4B.

Figure 3E:
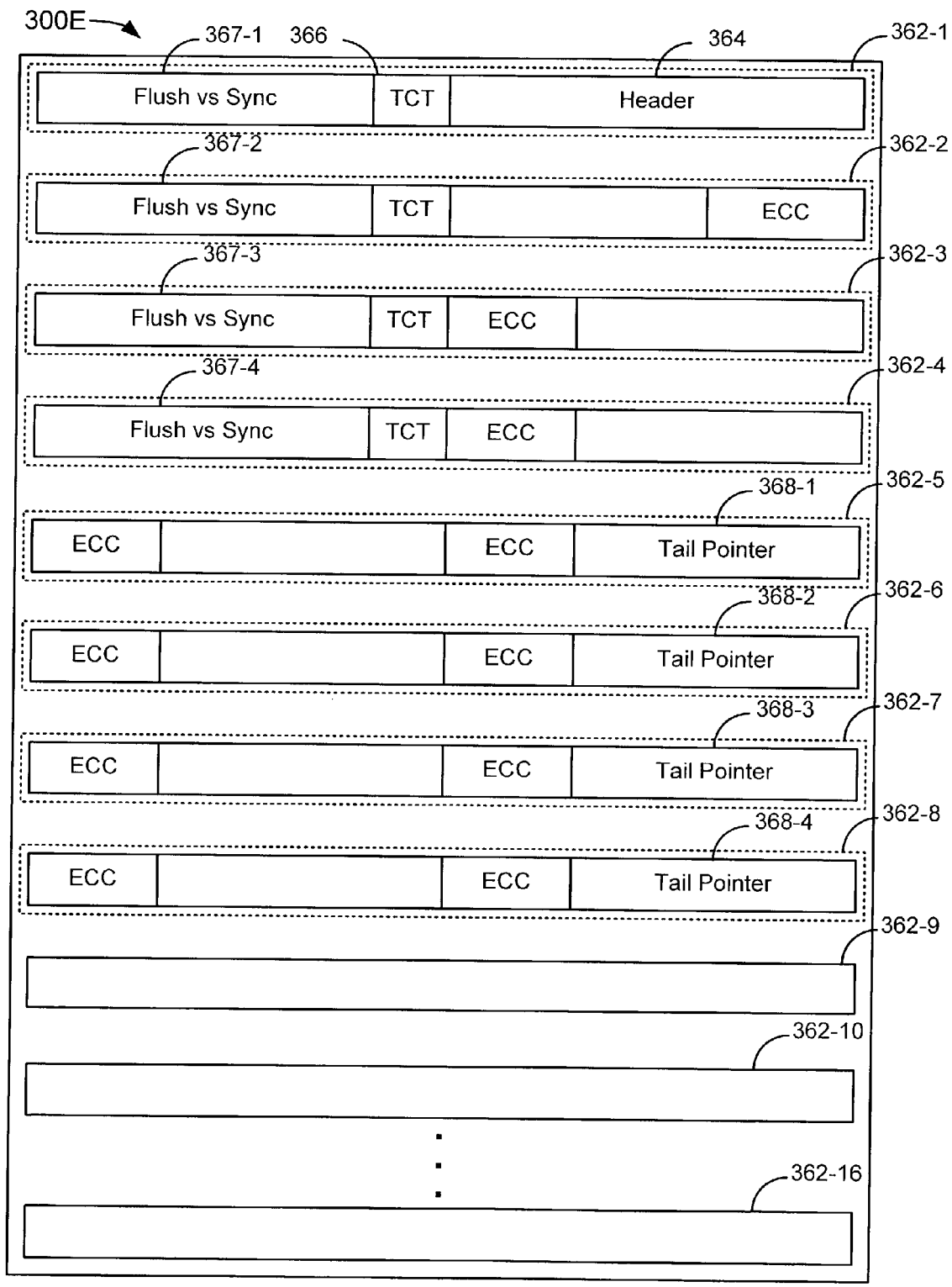

FIG. 3E is a block diagram of an exemplary flush cell 300E that is used to flush a path of an ingress-to-egress channel in the system 100 (FIG. 1) in an embodiment of the invention. The flush cell 300E includes 16 4-byte words 362-1 to 362-16. Accordingly, the flush cell 300E is the same size as the header 302 and payload 304 of the data cell 300A (FIG. 3A). The flush cell 300E includes a header 364 that is similar to the header 302 (FIG. 3A), one or more 3-bit TCT fields 366 that identify the test cell type (e.g., for the flush cell 300E the field is set to '100'), a field that differentiates flush cells from sync cells, flush vs. sync fields 367-1 to 367-N (collectively referred to as the flush vs. sync field 367), and a series of 11-bit tail pointer fields 368-1 to 368-4 (collectively referred to as the tail pointer field 368) that are set to a flush value (e.g., all zero). The tail pointer at a switching fabric is used to traverse a first-in-first-out queue (FIFO). When the tail pointer field 368 is used to set the tail pointer at the switching fabric to the flush value, the tail pointer is reset. In other words, the queue is emptied. A use for the flush cell 300E is discussed later with reference to FIGS. 4A, 4C, 4D, 4E, 4F, and 4G.

Figure 3F:
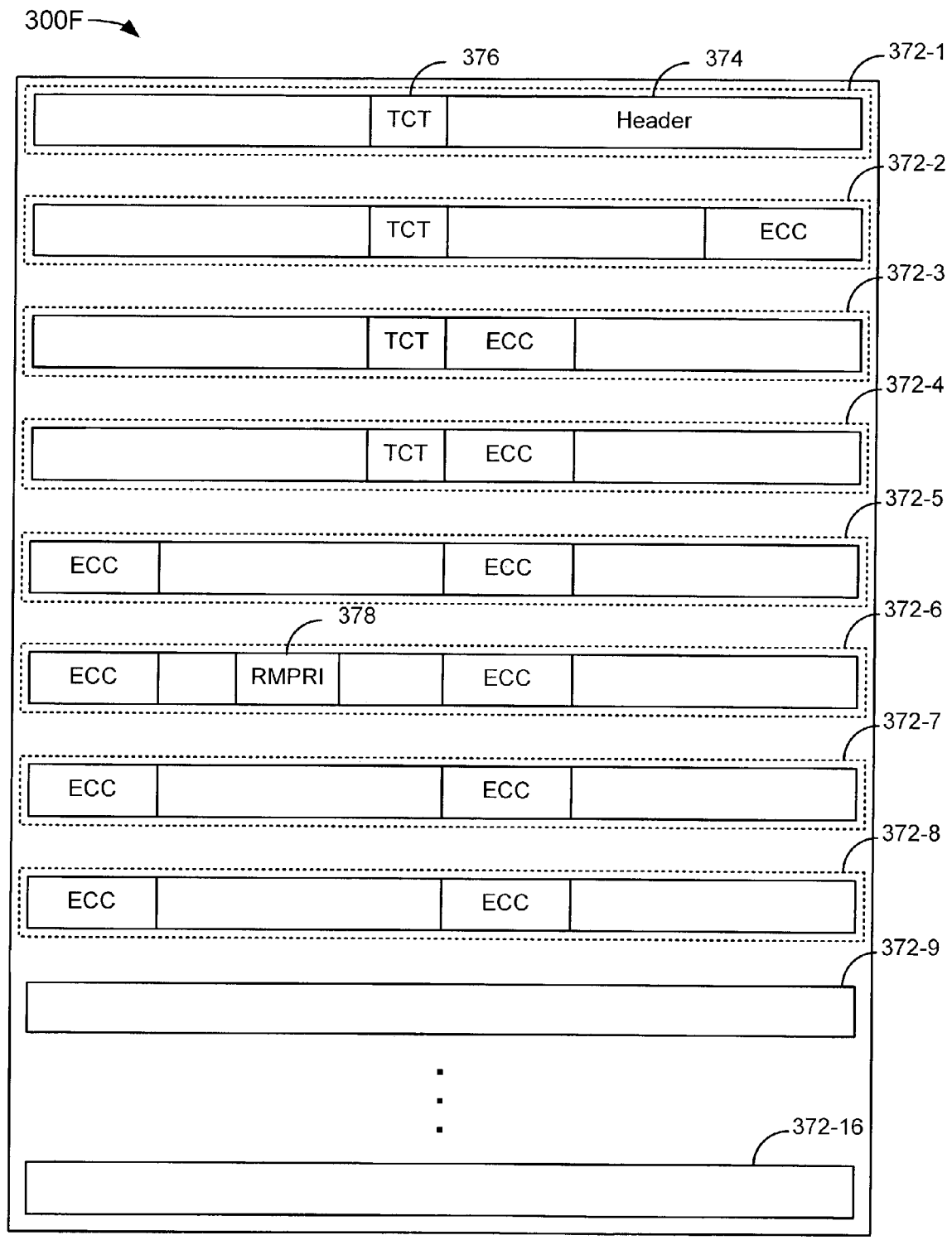

FIG. 3F is a block diagram of an exemplary sync request cell 300F that is used to request an ingress module generate a sync cell (see, e.g., FIG. 3G) in the system 100 (FIG. 1) in an embodiment of the invention. The sync request cell 300F includes 16 4-byte words 372-1 to 372-16. Accordingly, the sync request cell 300F is the same size as the header 302 and payload 304 of the data cell 300A (FIG. 3A). The sync request cell 300F includes a header 374 that is similar to the header 302 (FIG. 3A), one or more 3-bit TCT fields 376 that identify the test cell type (e.g., for the sync request cell 300F the field is set to '011'), and a 4-bit RMPRI field 378 that identifies one or more queues that are associated with either multicast or unicast cells and the priority of the one or more queues. In this example, the priority portion of the RMPRI field 378 is 3 bits long, which is sufficient to represent up to 8 priorities. A use for the sync request cell 300F is discussed later with reference to FIGS. 4F and 4G.

Figure 3G:
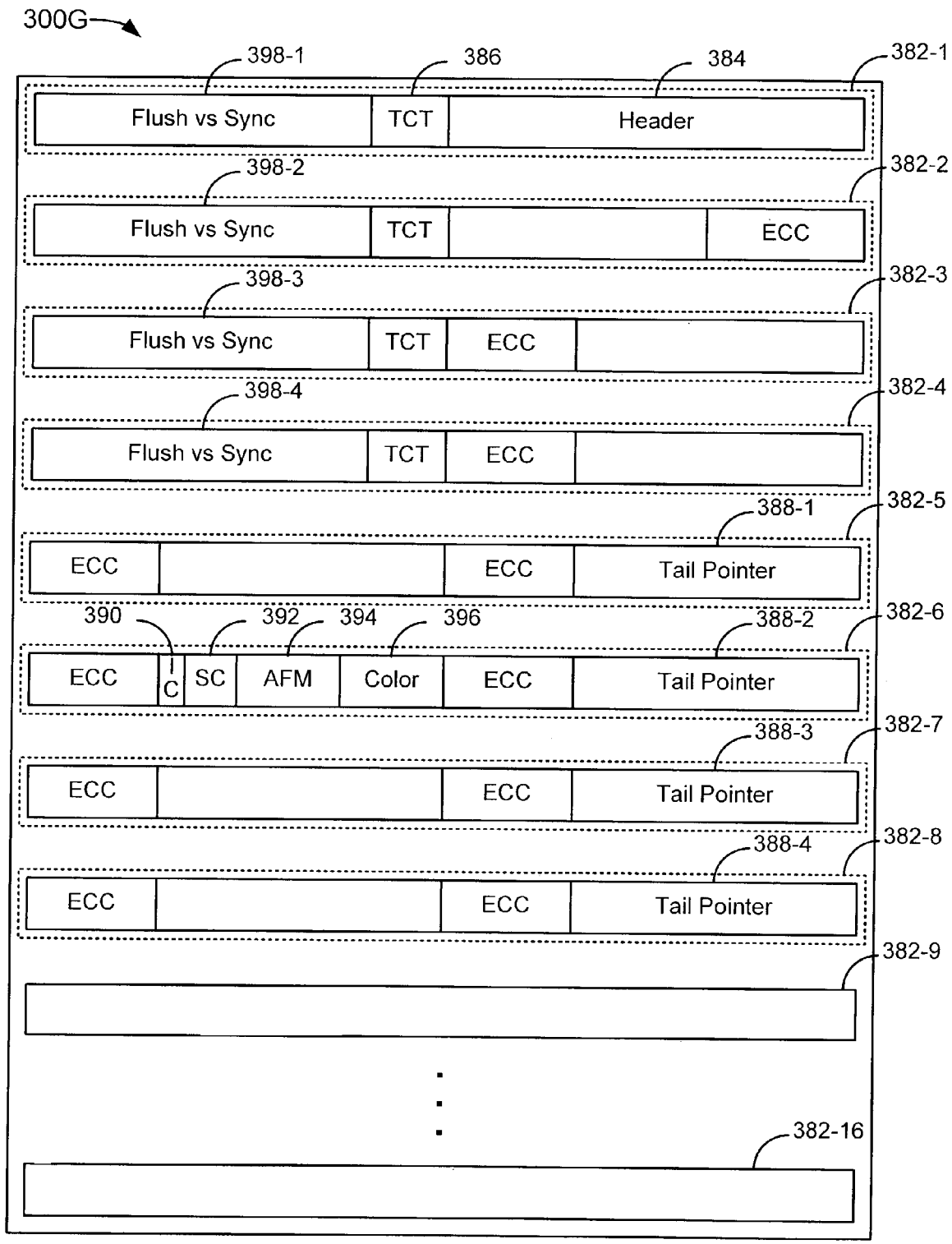

FIG. 3G is a block diagram of an exemplary sync cell 300G for use with the system 100 (FIG. 1) in an embodiment of the invention. The sync cell 300G includes 16 4-byte words 382-1 to 382-16. Accordingly, the sync cell 300G is the same size as the header 302 and payload 304 of the data cell 300A (FIG. 3A). The sync cell 300G includes a header 384 that is similar to the header 302 (FIG. 3A), one or more 3-bit TCT fields 386 that identify the test cell type (e.g., for the sync cell 300G the field is set to '101'), a field that differentiates flush cells from sync cells, flush vs. sync fields 398-1 to 398-4 (collectively referred to as the flush vs. sync field 398), a series of 11-bit tail pointer fields 388-1 to 388-4 (collectively referred to as the tail pointer field 388) that indicates the fabric queue tail pointer value that is expected by the ingress module that generated the sync cell 400G, an ignore color check flag 390, a sync column (SC) field 392, an AFM field 394 (for checking, not setting), and a color field 396. A use for the sync cell 300G is discussed later with reference to FIGS. 4D, 4F, and 4G.

FIGS. 4A-4G depict flowcharts of methods for maintaining data paths in accordance with embodiments of the invention. For the purpose of example only, the following description of the flowcharts includes references to FIGS. 3A-3G.

Figure 4A:
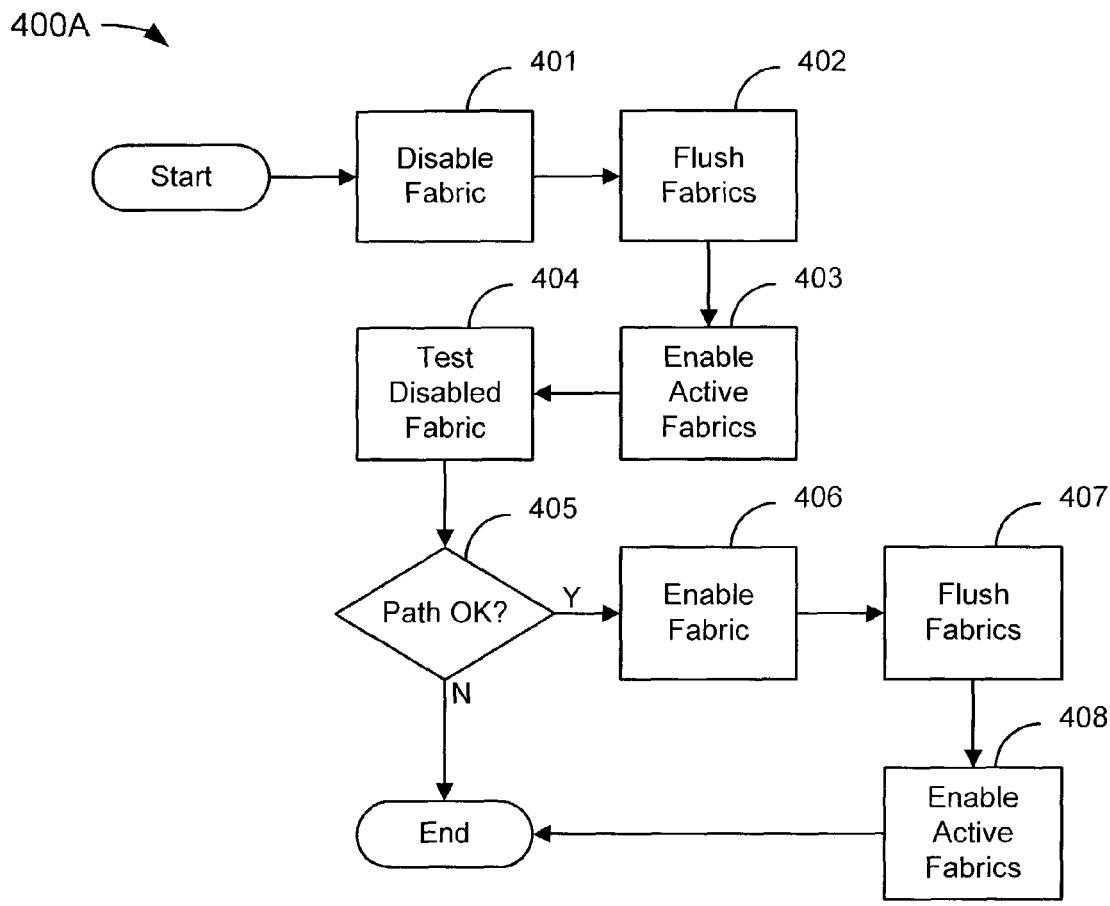
FIGS. 4A-4G depict flowcharts of methods for maintaining data paths in accordance with embodiments of the invention.

FIG. 4A depicts a flowchart 400A of a method for performing offline fabric diagnostics. The flowchart 400A starts at step 401 with changing a switching fabric configuration to disable a switching fabric. In an embodiment, an ingress stripes cells across each active switching fabric of a plurality of switching fabrics (see, e.g., FIG. 2) according to the switching fabric configuration. Disabling the switching fabric means the ingress stops sending data cells to the switching fabric. More specifically, the disabled, or inactive, switching fabric is removed from the striping sequence at the ingress. The ingress may continue to stripe cells across other switching fabrics while ignoring the disabled switching fabric. In other words, disabling a switching fabric does not require that the system be taken off line. In another embodiment, changing the switching fabric configuration to disable the switching fabric entails turning off a bit associated with the switching fabric in an AFM at the ingress. In this embodiment, the ingress informs the egress of the AFM change. It should be noted that an operational mask, described later, prevents an ingress from transmitting traffic across enabled switching fabrics until a lock is established.

Figures 6A, 6B:
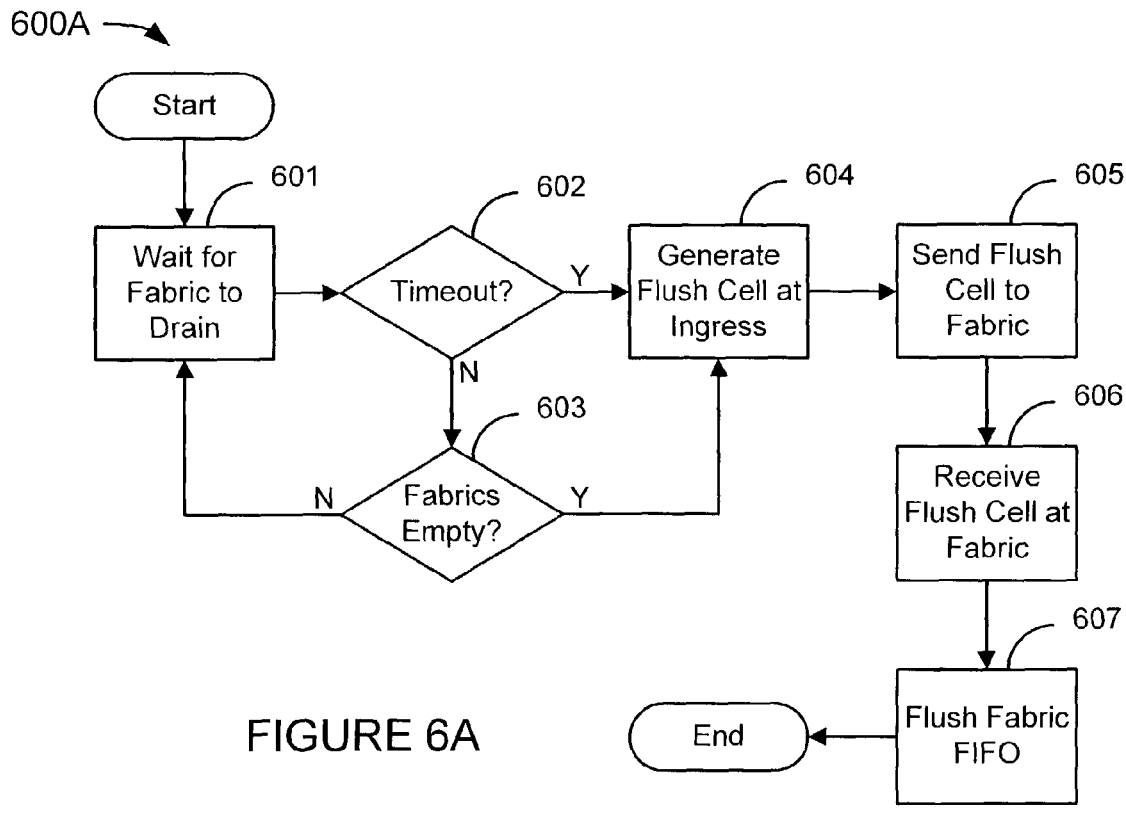
FIGS. 6A-6E depict flowcharts of exemplary subroutines for use with the flowcharts of FIGS. 4A-4G.

The flowchart 400A continues at step 402 with flushing the switching fabrics. In an embodiment, the flushing includes flushing the disabled switching fabric and each switching fabric identified in the switching fabric configuration. FIG. 6A illustrates an exemplary flowchart 600A for flushing a FIFO of a switching fabric. First, the ingress waits for the switching fabric to drain at step 601. Waiting for the switching fabric to drain means waiting for a period of time while the switching fabric continues forwarding cells that the ingress previously sent to the switching fabric. In an embodiment, the AFM indicates switching fabrics that are enabled for sending data, but a lock mask prevents the ingress from sending data regardless of the setting of the AFM. In other words, an operational mask determined by ANDing the AFM and a lock mask determines whether the ingress may send data on a switching fabric. An arbitrary number of masks may be used to provide additional control over the operational mask. In this way, when a change in configuration occurs, such as the disabling of a switching fabric, the operational mask prevents the ingress from sending data over enabled switching fabrics until a lock between the ingress and egress is accomplished. At decision point 602 it is determined whether a timeout has occurred. A timeout is desirable because occasionally a switching fabric becomes "stuck" and does not drain completely. If a timeout has not occurred (602-N), then it is determined at decision point 603 whether the switching fabric is empty. If not, the ingress continues waiting for the switching fabric to drain at step 601. When either the ingress has waited for a predetermined period of time and a timeout occurs (602-Y) or the switching fabric becomes empty (603-Y), the ingress generates a flush cell, such as flush cell 300E (FIG. 3E), at step 604. The ingress sends the flush cell to the switching fabric at step 605. The flush cell includes a flush value, such as the value of the tail pointer field 368 (FIG. 3E). The switching fabric uses a tail pointer to access a FIFO for cells received from the ingress. After the switching fabric receives the flush cell at step 606, the switching fabric flushes the relevant switching fabric FIFO at step 607. To flush the FIFO, the switching fabric sets the tail pointer to the flush value of the flush cell. When the switching fabric sets the tail pointer to the flush value, the FIFO is treated as empty (i.e., the switching fabric FIFO is flushed). Since each flush cell targets a specific FIFO, flushing is selective. Selective flushing limits impact on other system resources.

Figure 6C:
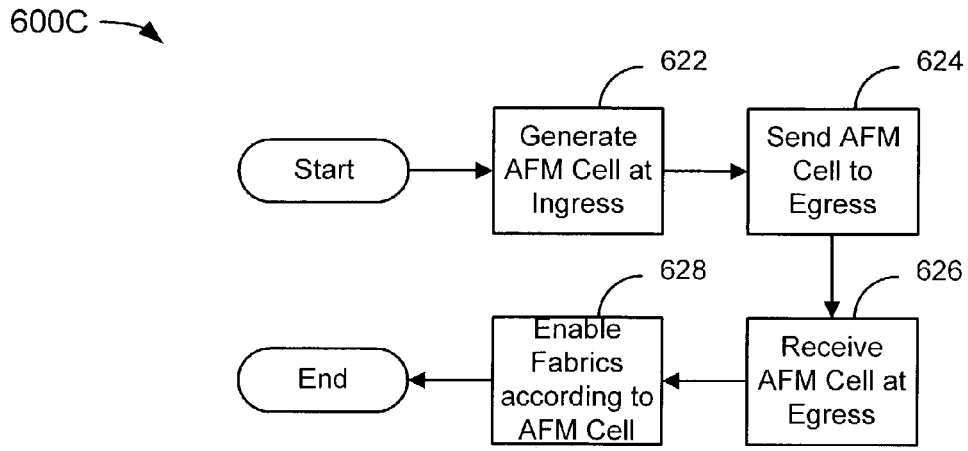

Referring once again to FIG. 4A, after each FIFO of each of the switching fabrics have been flushed, the active switching fabrics are enabled at step 403. FIG. 6C illustrates an exemplary flowchart 600C for enabling a switching fabric using an AFM. At step 622, an ingress generates an AFM cell, such as the AFM cell 300C (FIG. 3C). The ingress includes an AFM in, for example, the AFM field 348 (FIG. 3C) of the AFM cell. The AFM indicates which switching fabrics are active at the ingress. The ingress stripes across each of the active switching fabrics when transmitting cells. If a switching fabric is not active, then it is excluded from the striping sequence (i.e., the switching fabric is disabled). At step 624 the ingress sends the AFM cell to the egress. At step 626, the egress receives the AFM cell. At step 628, the egress enables switching fabrics according to the AFM included in the AFM cell. Obviously, if a switching fabric was enabled prior to receipt of the AFM cell, but the AFM cell indicates the switching fabric is no longer active, then that switching fabric is disabled.

Note that to avoid ordering issues between AFM cells and other cells that are dependent upon which fabrics are enabled for data transmission, in one embodiment AFM cells are sent to all egress queues to mark the boundary between the old striping sequence and the new striping sequence. In another embodiment, the ingress performs flushes to all fabric queues (see FIG. 6A) to guarantee that no outstanding cells that may be dependent upon the AFM are in-flight to the egresses, then sends AFM cells across each fabric enabled (according to the AFM) for data transmission to one or more of each egress queues, waits for the AFM cells to be received at the egresses, and then resumes normal operation.

Referring once again to FIG. 4A, after enabling the active switching fabric at step 403, one or more disabled paths are tested at step 404. FIG. 6B illustrates an exemplary flowchart 600B for testing one or more paths. In an embodiment, paths are tested for each switching fabric that is designated for testing in a TFM. The TFM is similar to the AFM in that it is a bit field mask, but the TFM indicates which switching fabrics are enabled for diagnostic testing while the AFM indicates which switching fabrics are enabled for forwarding data cells, non-diagnostic (e.g., flush, sync, sync request, heartbeat) test cells, and nop/null cells.

The flowchart 600B starts with an ingress generating a diagnostic cell set at step 611. The diagnostic cell set includes one or more diagnostic cells, such as the diagnostic cell 300B (FIG. 3B). In an embodiment, the diagnostic cell set includes one diagnostic cell per switching fabric in the system (see, e.g., FIG. 2). The diagnostic set may include fewer diagnostic cells if one or more of the switching fabrics are not enabled for diagnostic testing (e.g., the TFM is not set for one or more switching fabrics). Moreover, a diagnostic cell set may consist of a single diagnostic cell when a single switching fabric is tested. In an embodiment, the same diagnostic cell number, such as the value of the diagnostic cell number field 338 (FIG. 3B) identifies each diagnostic cell of a diagnostic cell set. The diagnostic cell number is established using a diagnostic cell number counter at the ingress. The diagnostic cell number counter is incremented each time a diagnostic cell set is generated. In an embodiment, the ingress generates a sequence of diagnostic cell sets. Each diagnostic cell of a sequence of diagnostic cells has a successively incremented diagnostic cell number. By using a sequence of diagnostic cells, an ingress-to-egress path may be tested more carefully. In general, the larger the number of diagnostic cells in the sequence of diagnostic cells, the better the test.

Since a sequence of diagnostic cells is generally valuable, at decision point 612 it is determined whether to generate additional diagnostic cell sets to lengthen the diagnostic cell sequence. If there is an additional diagnostic cell set to be added to the diagnostic cell sequence, then another diagnostic cell set is generated at step 611. After the ingress generates each diagnostic cell set of a sequence, the ingress sends the diagnostic cell sequence at step 613. It should be noted that the ingress may just as easily send each diagnostic cell, or each diagnostic cell set, as the cells are generated rather than waiting until the ingress has generated the entire diagnostic cell sequence.

At step 614, the egress receives the diagnostic cell sequence. At decision point 615 it is determined whether each diagnostic cell set of the diagnostic cell sequence is complete. A diagnostic cell set is complete if a diagnostic cell has been received on each switching fabric that is enabled for diagnostic testing. In an embodiment, the egress uses a TFM to determine whether a diagnostic cell was received on each switching fabric that is enabled for testing for each diagnostic cell set. If each diagnostic cell set is complete (615-Y), then at decision point 616 it is determined whether the diagnostic cell sets were received in sequence. In an embodiment, the egress compares the diagnostic cell number to a diagnostic cell counter. In an alternative, the egress includes one diagnostic cell counter per ingress. If the diagnostic cell number matches the diagnostic cell counter, the diagnostic cell is considered in sequence and the egress increments the diagnostic cell counter after each diagnostic cell set is verified. If the diagnostic cell sets were received in sequence (616-Y), then it is determined at decision point 617 whether test data, such as test data 332-9 to 332-16 (FIG. 3B), is as expected for each diagnostic cell. In an embodiment, the egress checks the validity of data by comparing a test value with the test data field of the diagnostic cell or a value derived from the test data field of the diagnostic cell (e.g., a CRC code or an ECC check result). The ingress sets the value of the test data field when the ingress generates the diagnostic cell. If the value of the test data field changes some time between when the ingress sends the diagnostic cell and when the egress receives the diagnostic cell, the egress should detect the change. If the egress detects a change, the egress should not validate the diagnostic cell. In an embodiment, the data sequence is located in a portion of the cell that corresponds to the payload of a data cell (see, e.g., FIG. 3A). If the test data is valid, then at step 619 the egress signals a positive diagnosis for the ingress-to-egress path and the flowchart 600B. It should be noted that the system may or may not take some action in the case of a positive diagnosis, since no remedial measures are typically necessary.

Returning to decision point 615, if the diagnostic cell sets are not complete, then at step 618 a negative diagnosis for the ingress-to-egress path results and the flowchart 600B ends. This occurs when, for example, a diagnostic cell is lost somewhere along the ingress-to-egress path. This may be because, for example, one of the switching fabrics being tested is broken. A negative diagnosis should cause the egress to initiate remedial measures to respond to the problem. Such procedures may include flushing the switching fabrics or taking failed switching fabrics offline.

Returning to decision point 616, if the diagnostic cell sets are not in sequence, then at step 618 a negative diagnosis for the ingress-to-egress path results and the flowchart 600B ends. In some cases, the ingress may anticipate that the diagnostic cell counter of the egress and the diagnostic cell counter of the ingress are not aligned. This may occur when, for example, the path between the ingress and the egress has been flushed. In such a case, a diagnostic cell number reset flag, such as the DR flag 340, may be set. When the diagnostic cell number reset flag is set, the egress updates the diagnostic cell counter associated with the ingress that generated the diagnostic cell to the diagnostic cell number value of the diagnostic cell. In most other cases, however, if the diagnostic cell counter and the diagnostic cell number of the next diagnostic cell do not match, a negative diagnosis results.

Returning to decision point 617, if the diagnostic cells do not contain valid test data, then at step 618 a negative diagnosis of the ingress-to-egress path results and the flowchart 600B ends. This may be due to data corruption.

Referring once again to FIG. 4A, it is determined at decision point 405 whether the path is OK. A path is "OK" if, for example, a path that includes the disabled fabric has a positive diagnosis. If not, the flowchart 400A ends without enabling the switching fabric. If the path is OK, then at step 406 the switching fabric configuration is changed to enable the one or more switching fabrics that were positively diagnosed for data transmission. Refer to step 401 for an example of how the switching fabric configuration is changed. At step 407, the switching fabrics are flushed (see, e.g., FIG. 6A). At step 408, the active switching fabrics are enabled (see, e.g., FIG. 6B). Then the flowchart 400A ends.

The method described with reference to FIG. 4A is valuable because paths may be tested without taking all paths offline. In other words, traffic forwarding continues on those paths that have not been disabled for diagnostic testing. Moreover, a system implementing the method has the ability to diagnose the disabled paths in-system.

Figure 4B:
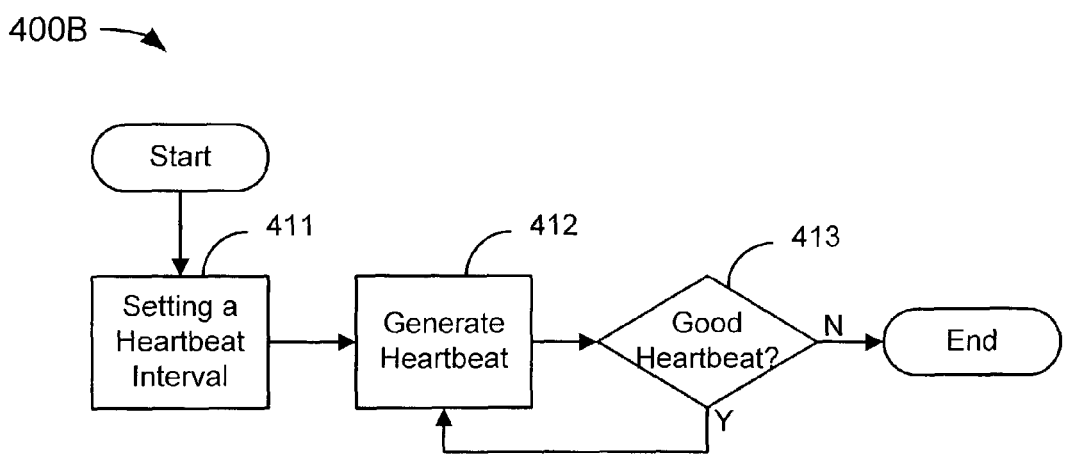

FIG. 4B depicts a flowchart 400B of a method for detecting defective paths from a multi-path traffic switching system while the system is on line. The flowchart 400B starts at step 411 with setting a heartbeat interval. In an embodiment, the rate at which the ingress generates heartbeats is programmable. A corresponding programmable value is located at the egress. The corresponding programmable value is an interval over which heartbeats should be received from the ingress. The flowchart 400B continues at step 412 with generating a heartbeat at an ingress.

Figure 6D:
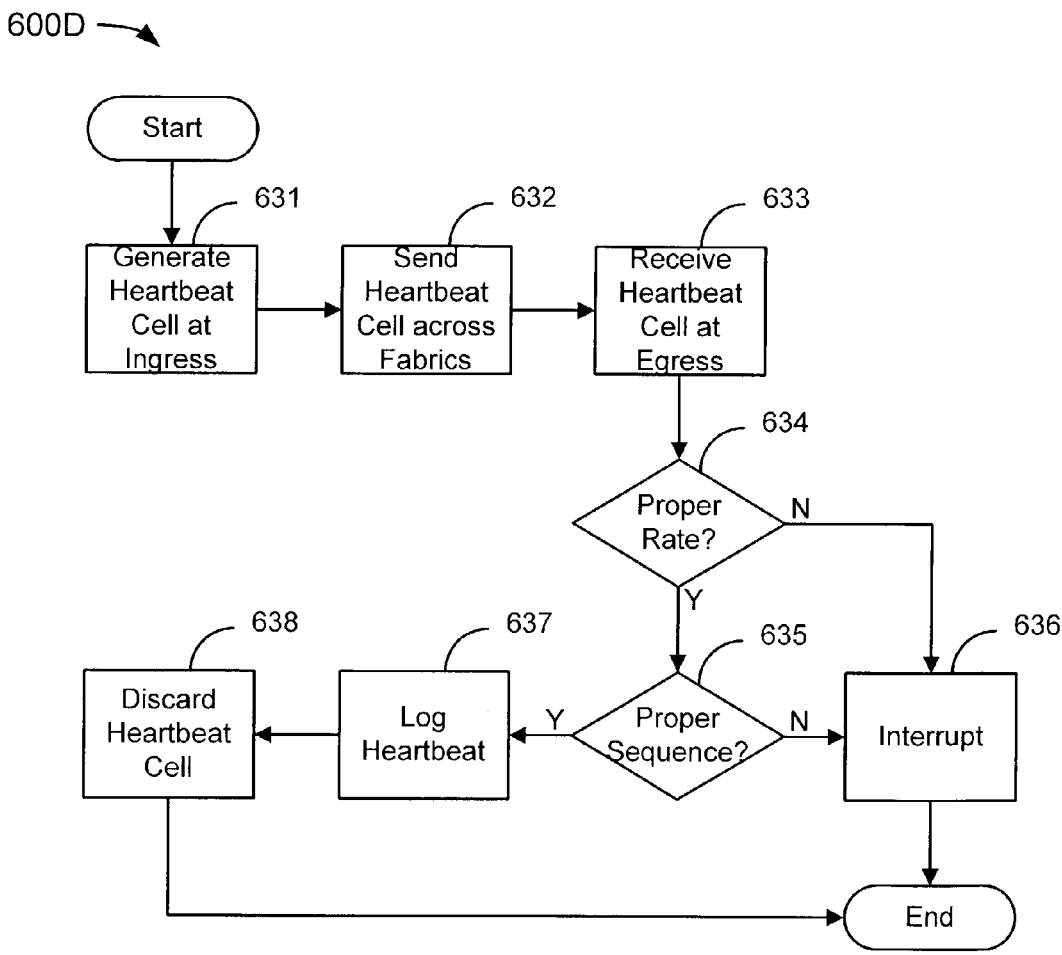

FIG. 6D illustrates an exemplary flowchart 600D for generating and testing a heartbeat cell. At step 631 an ingress generates a heartbeat cell, such as the heartbeat cell 300D (FIG. 3D). To facilitate setting the heartbeat rate, the ingress includes a heartbeat cell generator located in, for example, the ingress diagnostics module 228 (FIG. 2). The heartbeat cell generator includes a timer that indicates the rate at which the ingress generates a heartbeat for transmission to, for example, egresses. To facilitate receipt of the heartbeat cells at the egress, the egress includes a heartbeat cell detector located in, for example, the egress diagnostics module 250 (FIG. 2). The heartbeat cell detector should take into account slippage in the transmission of heartbeats when determining whether heartbeat cells arrive at the established interval. In other words, the egress must take into account the variability in the time it takes to transmit a heartbeat from the ingress to the egress. This variability may be due to, for example, variations in the amount of traffic. In an embodiment, the egress treats any heartbeat received within a period of time that is less than ½ an interval as received within the nearest interval. In another embodiment, the interval at which the egress expects heartbeats from a given ingress is programmed to be twice the interval at which the ingress is programmed to send heartbeats to each egress.

At step 632 the ingress sends the heartbeat cell across a switching fabric to an egress. In an embodiment, the ingress sends heartbeat cells across all active switching fabrics enabled for data transmission. Accordingly, the system checks each switching fabric in the ingress-to-egress path. At step 633 the egress receives the heartbeat cell. At decision point 634 it is determined whether the heartbeat cell is received at a proper interval since the last heartbeat cell was received or, for example, since a reset. If the heartbeat cell was not received within a proper interval, as determined by checking the programmable interval at the egress, an interrupt occurs at step 636 and the flowchart 600D ends. In an embodiment, the interrupt includes sending an interrupt to a line card CPU associated with the egress. In an alternative, a flushing and reinitialization of the ingress-to-egress path follows the interrupt. A heartbeat cell does not arrive in the proper interval if, for example, the switching fabric on which the heartbeat cell was sent is broken. It should be noted that the expected heartbeat interval should be equal to or greater than the interval at which the ingress generates heartbeat cells that target the egress.

If the egress receives a heartbeat cell at the proper rate (634-Y), then it is determined at decision point 635 whether the heartbeat cell is received in the proper sequence. In an embodiment, to facilitate keeping track of a sequence of heartbeat cells, the ingress includes a heartbeat sequence ID, such as the heartbeat sequence identifier 352-9 (FIG. 3D), in a heartbeat cell. The heartbeat sequence ID is indicative of the number of heartbeat cells generated over a period of time. The period of time may be, for example, since a previous reset. The proper sequence of heartbeat cells is determinable by comparing the heartbeat sequence ID with the logged heartbeat sequence ID of the previous heartbeat cell (or set of heartbeat cells) received at the egress. In an alternative embodiment, the heartbeat sequence ID is compared with a heartbeat sequence counter at the egress. The egress increments the heartbeat sequence counter after receipt of each heartbeat cell (or set of heartbeat cells). If the heartbeat cell is not in the proper sequence (635-N), then an interrupt occurs at step 636 and the flowchart 600D ends. If the heartbeat cell is in the proper sequence, then the egress logs receipt of the heartbeat cell at step 637, discards the heartbeat cell at step 638, and the flowchart 600D ends. It should be noted that, in an embodiment where heartbeat cells are sent across each active switching fabric, the egress may or may not also check an AFM, such as AFM 358 (FIG. 3D), included in each heartbeat cell to verify that a heartbeat cell was received on each active switching fabric enabled for data transmission.

Returning to FIG. 4B, it is determined at decision point 413 whether the heartbeat is good. A good heartbeat should be at the proper rate and in the proper sequence. If the heartbeat is good, then the flowchart generates another heartbeat at step 412 and steps 412 and 413 are repeated until a heartbeat is not good. If the heartbeat is not good (413-N), then the flowchart 400B ends. In this case, remedial measures may be required to fix the ingress-to-egress path.

The method described with reference to FIG. 4B is valuable because paths may be tested while the paths remain online. Moreover, a system implementing the method has the ability to detect errors in paths that have no data traffic. Furthermore, the system has the ability to differentiate between a lack of data traffic on a path and a failure in the path by determining that a heartbeat has not arrived at an egress of the ingress-to-egress channel within a programmable interval.

Figure 4C:
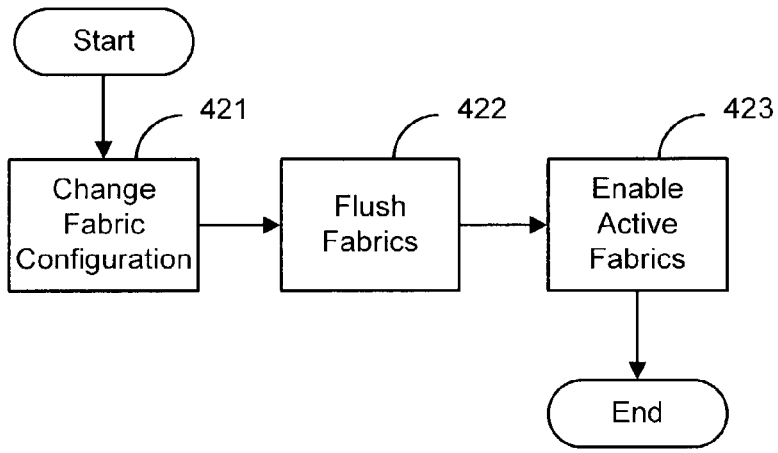

FIG. 4C depicts a flowchart 400C of a method for adding switching fabrics to and removing switching fabrics from a traffic switching system while the system is on line. The flowchart 400C is intended to illustrate a single pass for a changed switching fabric configuration. The switching fabric configuration changes if a new switching fabric is added to the system or a switching fabric is removed from the system. A switching fabric may be removed intentionally by disabling the switching fabric or unintentionally if the switching fabric is partially or completely nonfunctional. The flowchart 400C starts at step 421 with changing a switching fabric configuration. The change in configuration may be due to either an added switching fabric or a removed switching fabric. In an embodiment, when a switching fabric is removed, an AFM is updated to indicate the switching fabric is no longer active. In another embodiment, when a switching fabric is added, the AFM is updated to indicate the switching fabric is active. In an alternative, when a switching fabric is added, the AFM is updated automatically only if no other switching fabrics are online. In other words, in this alternative, an update is only automatic for the first added switching fabric. Other updates are by software additions. For example, software clears only one bit of a lock mask; the lock mask is described above with reference to FIG. 4A. In another alternative, the AFM is updated only by software additions. For example, software clears the lock mask. At step 422 each FIFO of each switching fabric that will be enabled for traffic by the AFM is flushed. FIG. 6A, described above, illustrates an exemplary flushing of a switching fabric. At step 423, active switching fabrics are enabled for data transmission. Then the flowchart 400C ends. FIG. 6C, described above, illustrates an exemplary enabling of a switching fabric.

The method described with reference to FIG. 4C is valuable because a system implementing the method has the ability to seamlessly add or remove fabrics. In other words, the system can add or remove fabrics while seamlessly transmitting packets. The system has the ability to change fabric configuration automatically with the detection of a change in the fabrics (i.e., an addition of a new fabric or removal of an old fabric) using hardware and/or software.

Figure 4D:
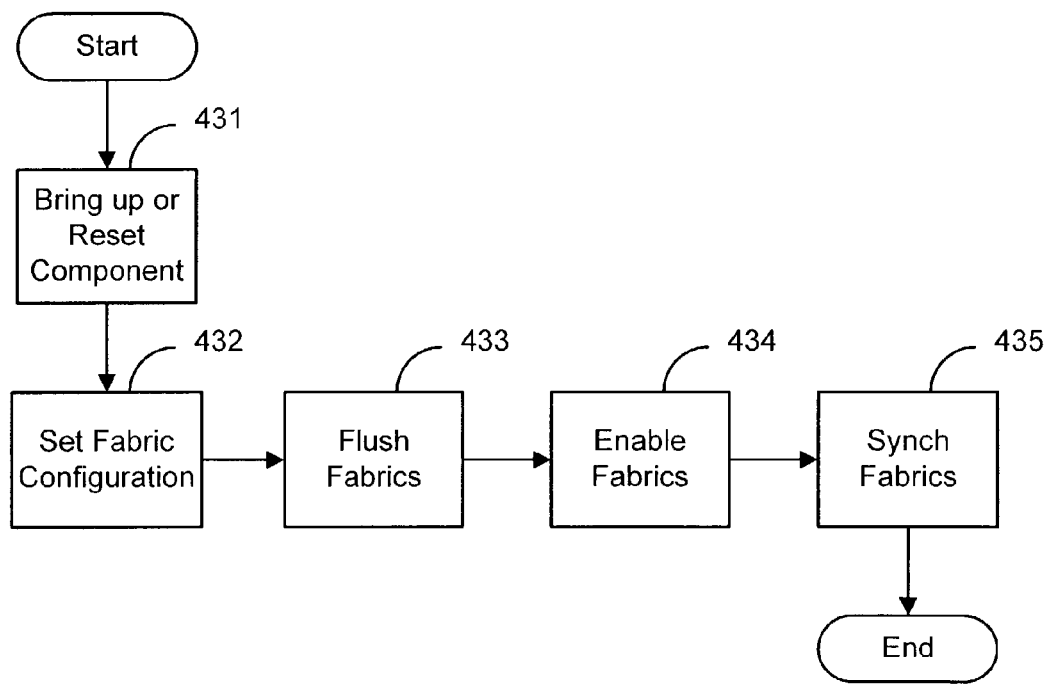

FIG. 4D depicts a flowchart 400D of a method for initializing a system after an ingress, switching fabric, or egress is brought online or reset. The flowchart 400D starts at step 431 with bringing up or resetting a component. Components include portions of an ingress-to-egress channel, such as ingresses, egresses, and switching fabrics. The flowchart 400D continues at step 432 with setting the switching fabric configuration to include the components to be initialized. Setting the switching fabric configuration is discussed above with reference to FIG. 3C. The flowchart 400D continues at step 433 with flushing switching fabrics. An exemplary flushing of the switching fabric is described above with reference to FIG. 6A. Typically, all FIFOs of all switching fabrics are flushed when an ingress, switching fabric, or egress is brought online or reset. The flowchart 400D continues at step 434 with enabling switching fabrics. An exemplary enabling of the switching fabric is described above with reference to FIG. 6C. The flowchart 400D continues at step 435 with synchronizing an ingress to an egress, then the flowchart 400D ends.

Figure 6E:
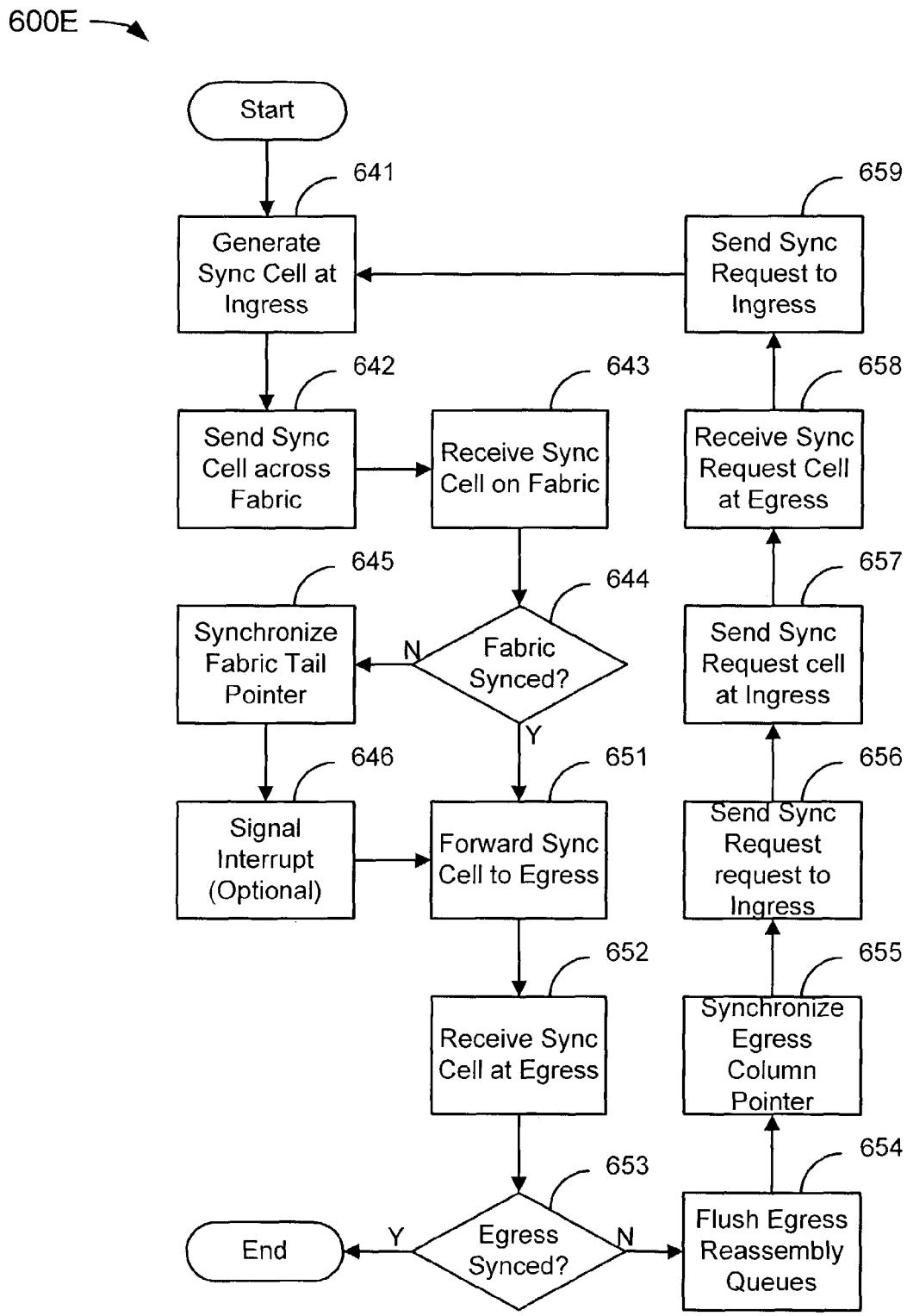

FIG. 6E illustrates an exemplary flowchart 600E for synchronizing an ingress to an egress. The flowchart 600E starts at step 641 with generating, at an ingress, a sync cell, such as the sync cell 300G (FIG. 3G). The flowchart 600E continues with sending the sync cell across a switching fabric at step 642, receiving the sync cell at the switching fabric at step 643, and determining at decision point 644 whether the switching fabric is synchronized according to the sync cell. If the switching fabric is not synchronized with the sync cell, then at step 645 one or more of the switching fabric tail pointers are synchronized according to a tail pointer, such as the tail pointer field 388 (FIG. 3G), at step 646 the switching fabric signals an interrupt, and the flowchart 600E continues to step 651. In an alternative, other remedial action is taken in lieu of or in addition to signaling the interrupt.

If the switching fabric is synchronized (644-Y), the switching fabric forwards the sync cell to an egress at step 651, the egress receives the sync cell at step 652, and at decision point 653 it is determined whether the egress is synchronized with the switching fabric. A color identifies each sync cell and a set of sync cells sent across different switching fabrics of an ingress-to-egress channel have the same color, such as found in the color field 396. Thus, the egress can distinguish between old and new sync cells and determine whether a sync cell has been lost. It should be noted that when a color sequence is starting or is restarted, the egress ignores the color. The egress determines whether to ignore color by checking a flag, such as the IC flag 390 (FIG. 3G). If the color of a sync cell does not match the color expected by the egress and the sync cell's ignore color bit is not set, then the egress is not synced. In addition to the color field in a sync cell, each sync cell also contains a sync column field. The sync column field should match the egress column pointer or else the ingress and the egress are not synced. If the egress is synchronized with the sync cell (and, accordingly, with the ingress), then the flowchart 600E ends. If not (653-N), then the egress reassembly queues are flushed at step 654. At step 655 the egress synchronizes its column pointer according to a sync column value, such as in the SC field 392 (FIG. 3G), of the sync cell. Then, at step 656, the egress sends its local ingress (the ingress on the same packet processor module as the egress) a sync request request. The sync request request includes information as to which egress reassembly queue is not synchronized (priority, unicast/multicast) and to which ingress the reassembly queue corresponds (CEP). In response to the sync request request, at step 657 the local ingress sends a sync request cell (or set of sync request cells) as per FIG. 3F to the egress specified by the CEP in the sync request request.

The RMPRI field of the sync request cell is determined by the reassembly queue information provided in the sync request request. At step 658, the egress that is on the same packet processor module as the ingress that sent the original sync cell will receive the sync request cell. Since the sync request cell contains priority and unicast/multicast information of the out-of-sync reassembly queue, and the egress that received the sync request cell knows which ingress it came from and hence the egress it came from (same packet processor module), then the egress can identify which reassembly queue needs synchronization. At step 659, the egress passes this information to its local ingress (same packet processor module) via a sync request message, the ingress generates a sync cell targeting the reassembly queue requiring synchronization at step 641, and the flowchart 600E continues as previously described. In an alternative embodiment (not shown), egress reassembly queues that are not in sync do not send sync request requests after step 655, but go to 'end' after flushing reassembly queues and updating column pointers. This would typically happen after an egress is first brought out of reset. In an embodiment, software can initiate the generation of sync request cells at an ingress.

Figure 4E:
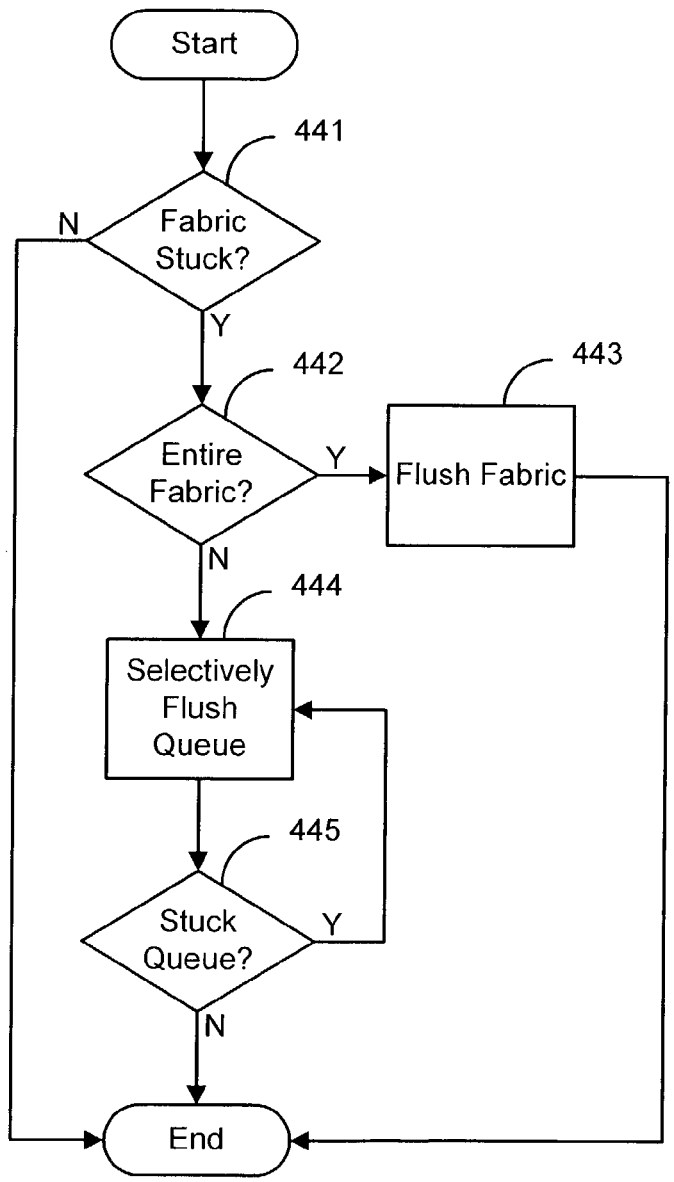

FIG. 4E depicts a flowchart 400E of a method for error detection and correction in a traffic forwarding system, such as the system 100 (FIG. 1). FIG. 4E is intended to illustrate how the traffic forwarding system reacts to a stuck switching fabric. The flowchart 400E starts at decision point 441 with determining whether a switching fabric is stuck. A switching fabric is stuck when, for example, traffic sent through the switching fabric from an ingress to an egress does not reach the egress. If the switching fabric is not stuck, then the flowchart 400E ends. On the other hand, if the switching fabric is stuck then it is determined at decision point 442 whether the entire switching fabric is stuck, as opposed to a subset but not all of the queues of the switching fabric. If the entire switching fabric is stuck, then the switching fabric is flushed at step 443. An exemplary flushing of the switching fabric is described above with reference to FIG. 6A. Since the entire switching fabric is flushed, the flowchart 600A, in an embodiment, is executed for each queue of the switching fabric. If the entire switching fabric is not stuck (443-N), then only one queue is flushed at step 444 and it is determined at decision point 445 whether any other queues are stuck. Steps 444 and 445 are repeated until no queues are stuck. It should be noted that the steps 444 and 445 are executed in parallel in an embodiment. In other words, every stuck queue is flushed approximately simultaneously. After one or more queues have been flushed, the flowchart 400E ends.

The method described with reference to FIG. 4E is valuable because a system implementing the method has the ability to selectively flush paths. Selectively flushing queues limits the impact of a flushing operation on other paths.

Figure 4F:
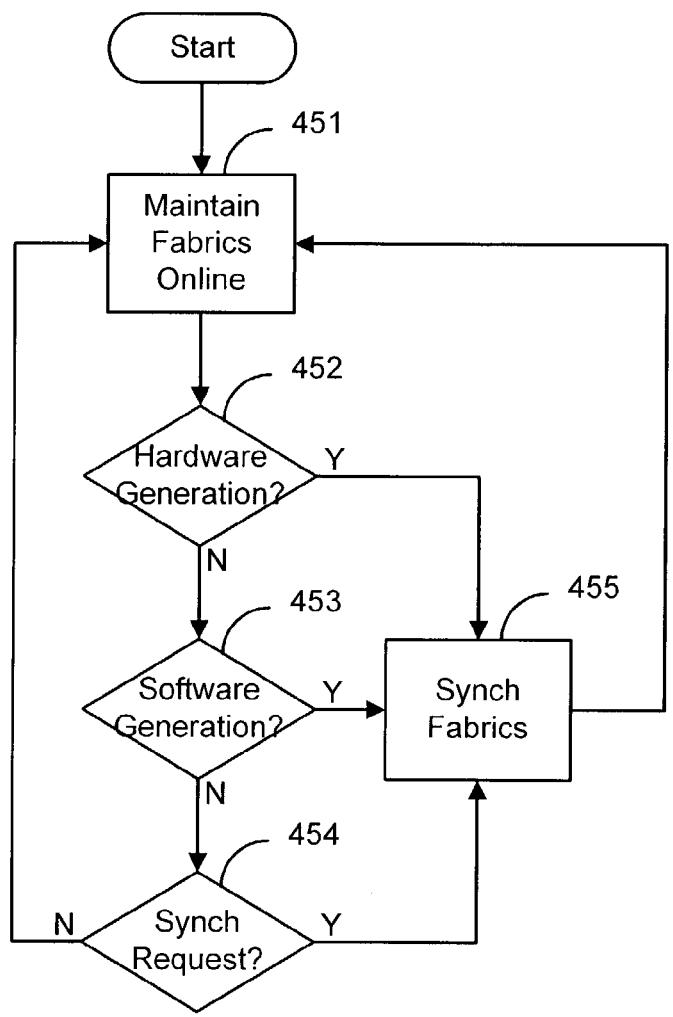

FIG. 4F depicts a flowchart 400F of a method for online error detection and correction. The flowchart 400F starts at step 451 with maintaining switching fabrics online. In an embodiment, the switching fabrics remain online throughout the flowchart 400F. At decision point 452 it is determined whether hardware indicates it is time to synchronize an ingress with one or more queues of a switching fabric or an egress. In an embodiment, the hardware includes a counter that sweeps through egresses and queues in the system at a programmable rate. If it is not time for synchronizing according to hardware, then at decision point 453 it is determined whether software indicates it is time to synchronize. Software requests for synchronizations are made, for example, when the system receives input requesting synchronization. If a software request has not been made, then at decision point 454 it is determined whether a sync request message has been received. A sync request message may be received from, for example, an egress when, for example, the egress detects an error. If no sync request message has been received, then the flowchart 400F starts over and repeats steps 451 to 454 until it is time for synchronization. If hardware indicates it is time to synchronize (452-Y), software indicates it is time to synchronize (453-Y), or a sync request message is received (454Y), then the switching fabrics are synchronized at step 455 and the flowchart goes to step 451 and continues as described previously. An exemplary synchronization of switching fabrics is described above with reference to FIG. 6E.

The method described with reference to FIG. 4B is valuable because paths may be tested and resynchronized while the paths remain online.

Figure 4G:
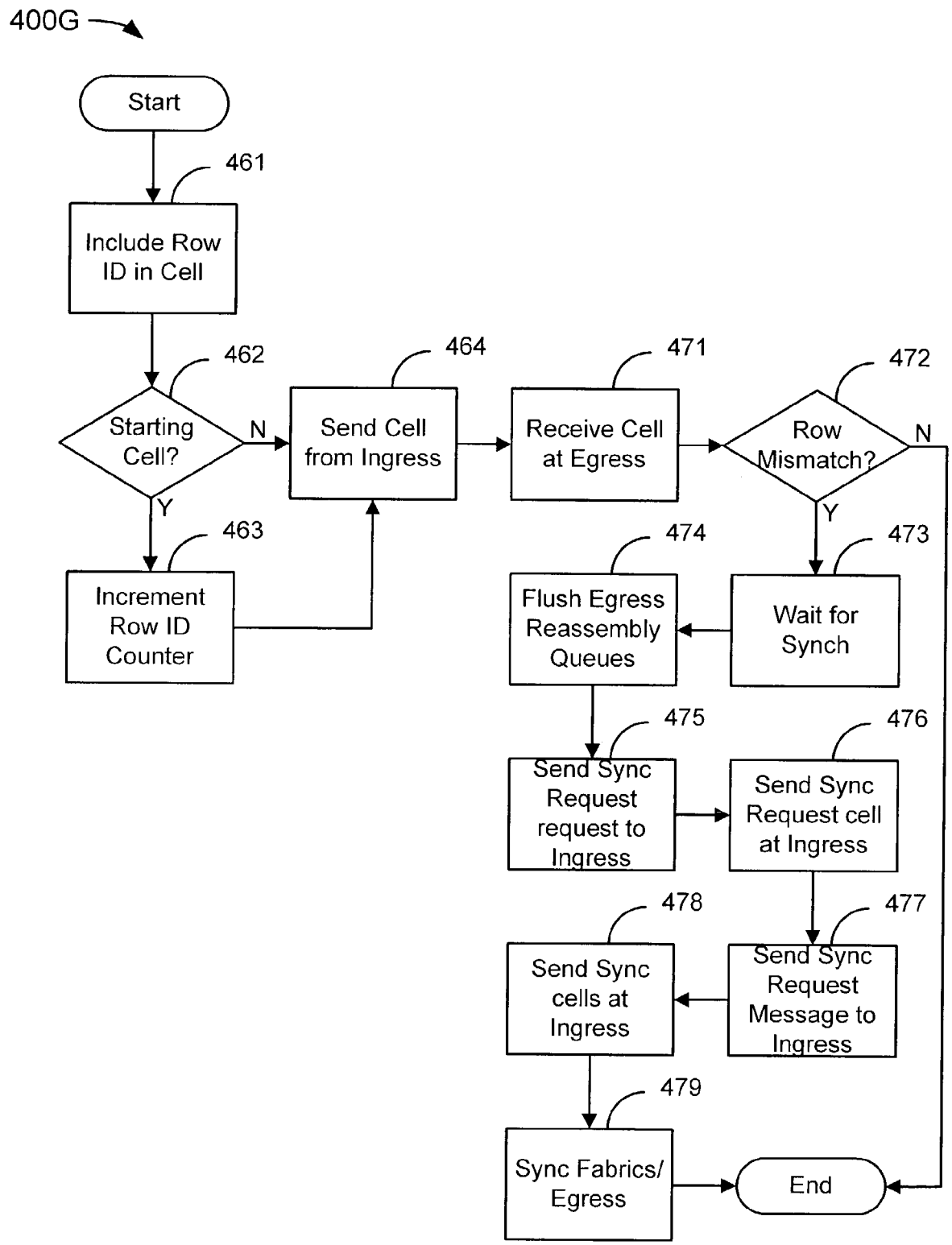

FIG. 4G depicts a flowchart 400G of a method for online unicast error detection and correction. The flowchart 400G starts at step 461 with including a row ID in a cell. In an embodiment, the row ID is included in both unicast data cells and unicast test cells. With respect to a data cell, such as the cell 300A (FIG. 3A), the row ID is included in, for example, the row field 326 (FIG. 3A). The row ID is not included in multicast cells because this form of error correction is not easily suited to multicast error correction. At decision point 462, it is determined whether the cell is a starting cell. In this case, "starting cell" refers to the cell that is striped across an arbitrary starting switching fabric. In an embodiment, the starting switching fabric is switching fabric 0 for unicast traffic. If the cell is a starting cell (462-Y), then the ingress increments a row ID counter at step 463 then sends the cell at step 464. If, on the other hand, the cell is not a starting cell (462-N), then the ingress sends the cell at step 464 with the current row ID counter. In this way, the starting cell and each subsequent cell striped across switching fabrics other than the starting switching fabric have the same row ID. It should be noted that switching fabrics may or may not be active for data transmission. In such cases, the ingress ignores the unused switching fabric, sends a cell on a next available switching fabric, and increments the row ID counter anyway.

At step 471 the egress receives the cell from the ingress. At decision point 472 it is determined whether a row mismatch has occurred. If the row ID of the cell matches the row ID of the other cells received across the switching fabrics since the last starting fabric, then no row mismatch has occurred and the flowchart 400G ends. If a row mismatch has occurred, then the egress waits for a sync cell from the ingress at step 473. While waiting for the sync cell, the egress will not accept cells that use the same reassembly queues as the mismatched cell (e.g., queues used by cells having the same traffic class as the cell). At step 474 the egress is flushed. In an embodiment, only the relevant queues of the egress are flushed (e.g., the queues used by cells having the same traffic class as the cell). In steps 475-478, the egress generates a sync request request to its local (on the same packet processor module) ingress, that ingress sends a sync request cell to the egress on the packet processor module of the ingress that corresponds to the reassembly queue with the mismatch, then that egress sends its local ingress a sync request message, which, in turn, sends a sync cell (or set of sync cells) back to the egress (reassembly queue) with the mismatch. (These steps are previously described with reference to steps 656-659 and 641 of FIG. 6E.) In step 479, the sync cells are used to synchronize the fabrics/egresses. An exemplary synchronization of switching fabrics is described above with reference to FIG. 6E. In another embodiment, step 475 is performed in parallel to steps 473 and 474.

The method described with reference to FIG. 4G is valuable because a system implementing the method has improved error detection with respect to unicast cells.

FIGS. 5A-5E depict exemplary striped traffic consistent with traffic striped across the subsystem 200 (FIG. 2) in an embodiment of the invention. FIG. 5A is intended to illustrate changes in switching fabric configuration that result in the disabling and subsequent enabling of one of a plurality of switching fabrics. At time periods 0 to 6, snapshots 500A show traffic passing through each of four switching fabrics 0 to 3. At time 0, the switching fabrics respectively forward cells of packet "A", A.0, A.1, A.2, and A.3. At time 1, the switching fabrics 0, 1, and 2 respectively forward the cells A.4, A.5, and A.6, but the switching fabric 3 is idle. The switching fabric 3 could be idle for a number of reasons, but for the purposes of this example, the switching fabric 3 is idle because it has been removed from the striping sequence at the ingress transmitting the cells of packet A. At time 2, the switching fabrics 0, 1, and 2 forward AFM cells that serve to inform the egress of the new striping sequence. The switching fabric 3, since it is no longer active, remains idle. At time 3, the switching fabrics 0, 1, and 2 respectively forward cells A.7, A.8, and A.9, while the switching fabric 3 remains idle. At time 4, the switching fabrics 0, 1, and 2 forward cells A.10, A.11, and A.12. The switching fabric 3 forwards an AFM cell. In this example, the AFM cell indicates that switching fabric 3 has been included in the striping sequence at the ingress. At time 5, the switching fabrics 0, 1, and 2 also forward the AFM. In this example, the AFM indicates that all of the switching fabrics are now active. Traffic then resumes across all switching fabrics starting with the switching fabric 3, which forwards cell A.13. At time 6, the switching fabrics respectively forward the cells A.14, A.15, A.16, and A.17.

FIG. 5B is intended to illustrate the forwarding of test cells across switching fabrics on a unicast path. At time periods 0 to 3, snapshots 500B show traffic passing through each of four switching fabrics 0 to 3. At time 0, the switching fabrics respectively forward cells of packet "A", A.0, A.1, A.2, and A.3. For the purposes of this example, A.9 is the last cell of packet A. At time 1, the switching fabrics 0, 1, and 2 respectively forward the cells A.4, A.5, and A.6, but the switching fabric 3 is forwards a test cell. For the purposes of this example, the test cell is ready for sending after a cell is sent on switching fabric 2. Accordingly, the test cell is forwarded on switching fabric 3. Some test cells, such as sync cells, come in sets. A set of test cells is as large as the number of switching fabrics that are active for testing. In this example, four switching fabrics are active for testing; so the test cells are sent on each of the four switching fabrics in succession. Accordingly, at time 2, the switching fabrics 0, 1, and 2 forward test cells and switching fabric 3 resumes forwarding cells of packet A with cell A.7. At time 3, the switching fabrics 0 and 1 forward cells of packet A, A.8 and A.9. However, the switching fabrics 2 and 3 forward cells of packet B, B.0 and B.1. In an embodiment, the cells of different packets are treated the same for the purpose of sending across switching fabrics. Unlike test cells sent on a unicast path, such as is shown in FIG. 5B, test cells sent on a multicast path must begin on a predetermined starting switching fabric.

FIG. 5C is intended to illustrate the forwarding of test cells across switching fabrics on a multicast path. For the purposes of FIG. 5C, the starting switching fabric is switching fabric 0. At time periods 0 to 3, snapshots 500C show traffic passing through each of four switching fabrics 0 to 3. At time 0, the switching fabrics respectively forward cells of packet "A", A.0, A.1, A.2, and A.3. At time 1, the switching fabrics 0, 1, and 2 respectively forward the cells A.4, A.5, and A.6, but the switching fabric 3 is idle. For the purposes of this example, A.6 is the last cell of packet A. Also for the purposes of this example, a test cell is ready for sending after a cell is sent on switching fabric 2. However, since the starting switching fabric for this multicast path is switching fabric 0, the first test cell must be forwarded on switching fabric 0, not switching fabric 3. A discussion of the rule requiring starting at the starting fabric, and when the rule can be broken, is discussed in co-pending patent application serial number (TBD), entitled "OPTIMAL LOAD BALANCING ACROSS MULTIPLE SWITCHING FABRICS", which has been incorporated by reference. Furthermore, for the purposes of this example, a cell from a different packet is ready for sending after a cell is sent on switching fabric 2. However, since the starting switching fabric for this multicast path is switching fabric 0, the cells of the different packet must be forwarded starting on switching fabric 0, too. Therefore, even though A.6 is the last cell of packet A, the switching fabric 3 is idle. It should be noted if A.7 were the last cell of packet A, then switching fabric 3 would forward cell A.7 (because A.7 is not the first cell of a packet) instead of remaining idle. In any case, at time 2, the switching fabrics respectively forward the test cells. Then, at time 3, the switching fabrics respectively forward the cells B.0, B.1, B.2, and B.3.

FIG. 5D is intended to illustrate an error in sending test cells across switching fabrics. At time periods 0 to 3, snapshots 500D show traffic passing through each of four switching fabrics 0 to 3. At time 0, the switching fabrics respectively forward cells of packet "A", A.0, A.1, A.2, and A.3. At time 1, the switching fabrics 0 and 2 respectively forward the cells A.4 and A.6, but the switching fabrics 1 and 3 forward test cells; and at time 2, the switching fabrics 0 and 2 forward test cells while the switching fabrics 1 and 3 are idle. In this example, the test cells should be forwarded in succession when the system is working properly. As is apparent in this example, the test cells are interspersed with data cells at times 1 and 2. Accordingly, the system should signal an error and/or attempt to resynchronize in this case.

In one embodiment, the method steps described above are embodied in a computer-readable media as computer instruction code. It shall be appreciated that not all methods steps described must be performed, nor must they be performed in the order stated.

The term multicasting is defined broadly to include broadcasting. The terms path and channel are defined broadly to include an ingress-to-egress path for a single traffic class across a single switching fabric, an ingress-to-egress path for a single traffic class across a plurality of switching fabrics, an ingress-to-egress path for a plurality of traffic classes across a single switching fabric, an ingress-to-egress path for a plurality of traffic classes across a plurality of switching fabrics, and an ingress-to-egresses path similar to the aforementioned ingress-to-egress paths, but for a plurality of egresses.

Although specific embodiments of the invention have been described and illustrated, the invention is not to be limited to the specific forms or arrangements of parts as described and illustrated herein. The invention is limited only by the claims.

What is claimed is:

1. A method for performing offline fabric diagnostics, comprising:
   removing a switching fabric from a switching fabric configuration so that the removed switching fabric is disabled from receiving data cells from an ingress, wherein the switching fabric configuration identifies active switching fabrics which are enabled to receive the data cells from the ingress;
   generating a diagnostic cell;

simultaneously transmitting:
   the diagnostic cell from the ingress across the disabled switching fabric; and
   the data cells across the active switching fabrics identified in the switching fabric configuration;
receiving the diagnostic cell at an egress;
determining that the diagnostic cell was correctly received; and
adding the disabled switching fabric to the switching fabric configuration so that the added switching fabric is enabled to receive subsequent data cells from the ingress.

2. The method of claim 1, further comprising:
   determining the switching fabric comprises a stuck path, wherein a packet fails to reach a destination over the stuck path of the switching fabric;
   generating a flush cell;
   selectively flushing the stuck path of the switching fabric; and
   enabling switching fabrics according to the switching fabric configuration.

3. The method of claim 1, wherein said removing further comprises:
   selecting a switching fabric for offline diagnostics; and
   altering an active fabric mask associated with the switching fabric configuration, wherein the active fabric mask comprises a bit to indicate whether the selected switching fabric is off-line and disabled for data transfer, or whether the selected switching fabric is online and enabled for data transfer.

4. The method of claim 1, wherein the diagnostic cell includes test data, said determining further comprising:
   determining that a previous diagnostic cell was not skipped; and
   determining that test data associated with the diagnostic cell was received correctly.

5. A traffic switching system configured to perform offline fabric diagnostics, comprising:
   a plurality of switching fabrics;
   an ingress module, coupled to the plurality of switching fabrics, including:
     an ingress diagnostics module configured to:
       remove a switching fabric of the plurality of switching fabrics from a switching fabric configuration so that the removed switching fabric is disabled from receiving data cells from the ingress module, wherein the switching fabric configuration identifies active switching fabrics which are enabled to receive the data cells from the ingress; and
       generate a diagnostic cell;
     a transmission module configured to simultaneously transmit:
       the diagnostic cell from the ingress module across the disabled switching fabric; and
       the data cells across the active switching fabrics identified in the switching fabric configuration;
   an egress module, coupled to the switching fabrics, including:
     a receive module configured to receive cells, including the diagnostic cell and the data cells, from the switching fabrics;
     a packet constructor configured to reassemble packets from cells received across the switching fabrics according to the switching fabric configuration; and
     an egress diagnostics module configured to:
       determine that the diagnostic cell was correctly received; and
       add the disabled switching fabric to the switching fabric configuration so that the added switching fabric is enabled to receive subsequent data cells from the ingress.

6. The system of claim 5, wherein the ingress diagnostics module is further configured to determine the plurality of switching fabrics comprises a stuck path, wherein a packet fails to reach a destination over the stuck path of the plurality of switching fabrics, and to generate a flush cell to selectively flush the stuck path of the plurality of switching fabrics.

7. The system of claim 5, wherein the diagnostic cell is a second diagnostic cell of a diagnostic cell sequence, and wherein the egress diagnostics module is further configured to:
   determine that a first diagnostic cell of the diagnostic cell sequence was received; and
   determine that test data associated with the second diagnostic cell was received correctly.

* * * * *